ns503B2" />

United States Patent
Chen et al.

(10) Patent No.: US 10,229,503 B2
(45) Date of Patent: Mar. 12, 2019

(54) METHODS AND SYSTEMS FOR SPLITTING MERGED OBJECTS IN DETECTED BLOBS FOR VIDEO ANALYTICS

(71) Applicant: QUALCOMM Incorporated, San Diego, CA (US)

(72) Inventors: Ying Chen, San Diego, CA (US); Ning Bi, San Diego, CA (US); Zhongmin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/599,281

(22) Filed: May 18, 2017

(65) Prior Publication Data

US 2018/0253848 A1   Sep. 6, 2018

Related U.S. Application Data

(60) Provisional application No. 62/466,935, filed on Mar. 3, 2017.

(51) Int. Cl.
  *G06T 7/11* (2017.01)
  *G06T 7/70* (2017.01)

(52) U.S. Cl.
  CPC ............... *G06T 7/11* (2017.01); *G06T 7/70* (2017.01); *G06T 2210/12* (2013.01)

(58) Field of Classification Search
  USPC ........................................... 382/103
  See application file for complete search history.

(56) References Cited

U.S. PATENT DOCUMENTS

| 2003/0095707 | A1 | 5/2003 | Colmenarez et al. |
| 2004/0032906 | A1 | 2/2004 | Lillig |
| 2008/0166045 | A1 | 7/2008 | Xu et al. |
| 2008/0240496 | A1 | 10/2008 | Senior |
| 2009/0087085 | A1* | 4/2009 | Eaton et al. ............ G06F 15/18 382/159 |
| 2009/0304229 | A1 | 12/2009 | Hampapur et al. |
| 2018/0047171 | A1* | 2/2018 | Chen et al. ............... G06T 7/20 382/103 |

* cited by examiner

*Primary Examiner* — Gregory F Cunningham
(74) *Attorney, Agent, or Firm* — Polsinelli/Qualcomm

(57) ABSTRACT

Methods, apparatuses, and computer-readable media are provided for splitting one or more merged blobs for one or more video frames. A blob detected for a current video frame is identified. The identified blob includes pixels of at least a portion of a foreground object in the current video frame. The identified blob is determined to be associated with two or more blob trackers from a plurality of blob trackers. The plurality of blob trackers are received from an object tracking operation performed for a previous video frame. It is then determined whether one or more splitting conditions are met. The splitting conditions can be based on a spatial relationship between bounding regions of the two or more blob trackers and a bounding region of the identified blob. The identified blob can be split into a first blob and a second blob in response to determining the one or more splitting conditions are met. If the identified blob is split, the first blob and the second blob are output for object tracking for the current frame by an object tracking system. In some cases, the identified blob is not output for object tracking for the current frame.

30 Claims, 23 Drawing Sheets

Blob Splitting Process

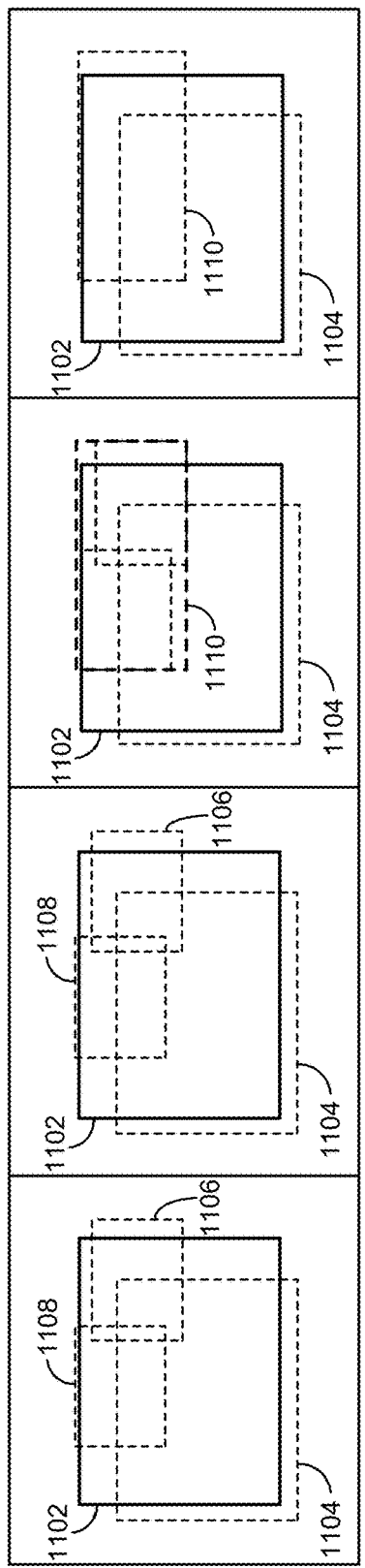

1500

IDENTIFY A BLOB DETECTED FOR A CURRENT VIDEO FRAME, WHEREIN THE IDENTIFIED BLOB INCLUDES PIXELS OF AT LEAST A PORTION OF A FOREGROUND OBJECT IN THE CURRENT VIDEO FRAME
1502

DETERMINE THE IDENTIFIED BLOB IS ASSOCIATED WITH TWO OR MORE BLOB TRACKERS FROM A PLURALITY OF BLOB TRACKERS, WHEREIN THE PLURALITY OF BLOB TRACKERS ARE RECEIVED FROM AN OBJECT TRACKING OPERATION PERFORMED FOR A PREVIOUS VIDEO FRAME
1504

DETERMINE ONE OR MORE SPLITTING CONDITIONS ARE MET
1506

IN RESPONSE TO DETERMINING THE ONE OR MORE SPLITTING CONDITIONS ARE MET, SPLIT THE IDENTIFIED BLOB INTO A FIRST BLOB AND A SECOND BLOB
1508

OUTPUT THE FIRST BLOB AND THE SECOND BLOB FOR OBJECT TRACKING FOR THE CURRENT FRAME
1510

FIG. 15

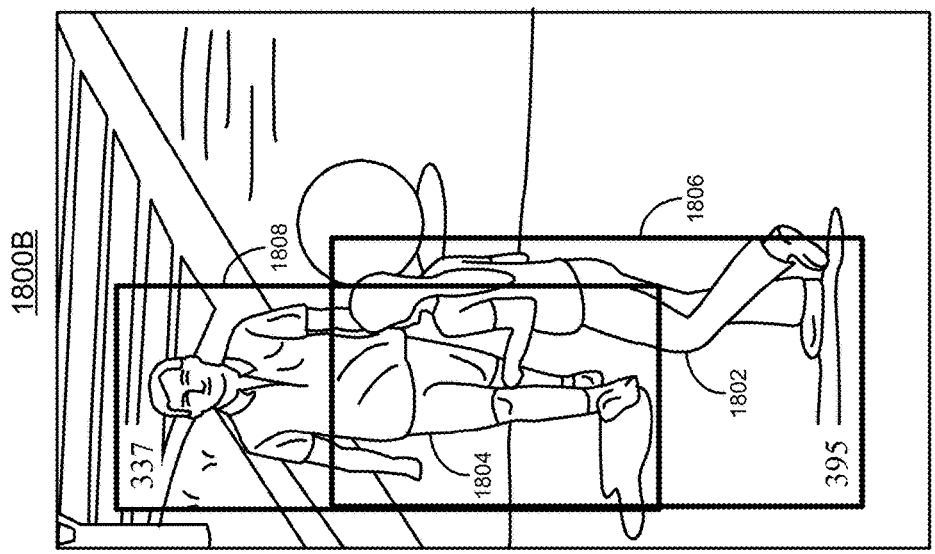
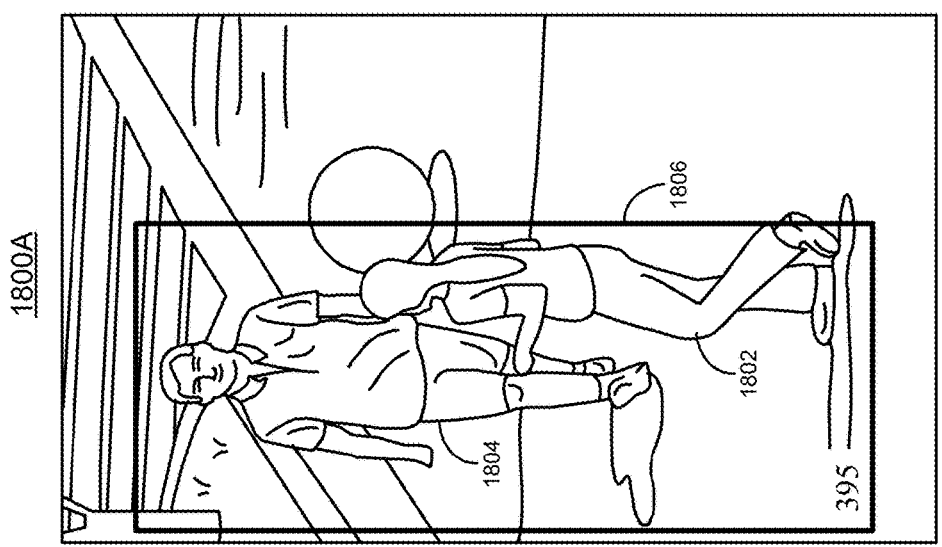

METHODS AND SYSTEMS FOR SPLITTING MERGED OBJECTS IN DETECTED BLOBS FOR VIDEO ANALYTICS

CROSS-REFERENCE TO RELATED APPLICATIONS

This application claims the benefit of U.S. Provisional Application No. 62/466,935, filed Mar. 3, 2017, which is hereby incorporated by reference, in its entirety.

FIELD

The present disclosure generally relates to video analytics, and more specifically to techniques and systems for splitting merged objects in blobs detected using video analytics.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for splitting merged objects in blobs detected using video analytics. Video analytics is based on background subtraction to detect and track motion objects. Such a video analytics system can contain a blob (or object) detection component and a blob (or object) tracking component. The blob detection component can use data from one or more video frames to generate or identify blobs for the one or more video frames. A blob represents at least a portion of one or more objects in a video frame (also referred to as a "picture"). Blob detection can utilize background subtraction to determine a background portion of a scene and a foreground portion of scene. Blobs can then be detected based on the foreground portion of the scene. The detected blobs can be provided, for example, for blob processing, object tracking by the blob (or object) detection component, and other video analytics functions. For example, temporal information of the blobs can be used to identify stable objects or blobs so that a tracking layer can be established.

In some cases, tracked objects can move close together for a certain amount of time. For example, two people may walk toward each other and have a conversation. When objects become close enough, the blob detection component may detect a single blob for some or all of the objects. Multiple objects that are detected as a single blob are referred to as merged objects (e.g., two objects being merged together). Blob trackers associated with the merged objects are also merged in such cases, and are referred to as merged trackers. The accuracy of the entire tracking system drops whenever such a merge happens. In addition, a conventional object tracking system may not be accurate enough to re-identify the merged trackers even after the associated objects split apart in the future (e.g., the two people walk away from one another). Preventing blob trackers from being merged can significantly improve the video analytics system.

The techniques and systems described herein can split merged objects that are encompassed within a single bounding box as a result of blob detection. The techniques and systems can handle cases in which two objects are merged, and also cases when three or more objects are merged. The techniques and systems can also tolerate a large percentage of overlap between two objects.

According to at least one example, a method of splitting one or more merged blobs for one or more video frames is provided. The method includes identifying a blob detected for a current video frame. The identified blob includes pixels of at least a portion of a foreground object in the current video frame. The method further includes determining the identified blob is associated with two or more blob trackers from a plurality of blob trackers. The plurality of blob trackers are received from an object tracking operation performed for a previous video frame. The method further includes determining one or more splitting conditions are met, and, in response to determining the one or more splitting conditions are met, splitting the identified blob into a first blob and a second blob. The method further includes outputting the first blob and the second blob for object tracking for the current frame.

In another example, an apparatus is provided for splitting one or more merged blobs for one or more video frames. The apparatus includes a processor and a memory configured to store video data associated with the one or more video frames. The processor is configured to and can identify a blob detected for a current video frame. The identified blob includes pixels of at least a portion of a foreground object in the current video frame. The processor is configured to and can determine the identified blob is associated with two or more blob trackers from a plurality of blob trackers. The plurality of blob trackers are received from an object tracking operation performed for a previous video frame. The processor is configured to and can determine one or more splitting conditions are met. The processor is configured to and can, in response to determining the one or more splitting conditions are met, split the identified blob into a first blob and a second blob. The processor is configured to and can output the first blob and the second blob for object tracking for the current frame.

In another example, non-transitory computer-readable medium having stored thereon instructions that, when executed by one or more processors, cause the one or more processor to: identify a blob detected for a current video frame, wherein the identified blob includes pixels of at least a portion of a foreground object in the current video frame; determine the identified blob is associated with two or more blob trackers from a plurality of blob trackers, wherein the plurality of blob trackers are received from an object tracking operation performed for a previous video frame; determine one or more splitting conditions are met; in response to determining the one or more splitting conditions are met, split the identified blob into a first blob and a second blob; and output the first blob and the second blob for object tracking for the current frame.

In another example, an apparatus for splitting one or more merged blobs for one or more video frames is provided. The apparatus comprises means for identifying a blob detected for a current video frame. The identified blob includes pixels of at least a portion of a foreground object in the current video frame. The apparatus further comprises means for determining the identified blob is associated with two or more blob trackers from a plurality of blob trackers. The plurality of blob trackers are received from an object tracking operation performed for a previous video frame. The apparatus further comprises means for determining one or more splitting conditions are met, and means for, in response to determining the one or more splitting conditions are met, splitting the identified blob into a first blob and a second blob. The apparatus further comprises means for outputting the first blob and the second blob for object tracking for the current frame.

In some aspects, locations of the plurality of blob trackers in the current video frame are based on locations of blobs tracked by the plurality of blob trackers for the previous video frame.

In some aspects, the one or more splitting conditions are based on a spatial relationship between bounding regions of the two or more blob trackers and a bounding region of the identified blob.

In some aspects, the first blob is associated with a first bounding region of a first blob tracker of the two or more blob trackers, and the second blob is associated with a second bounding region of a second blob tracker of the two or more blob trackers.

In some aspects, the identified blob is not output for object tracking for the current frame.

In some aspects, the method, apparatuses, and computer readable medium described above further comprise: obtaining a list of blobs detected for the current frame, the list of blobs including the identified blob; modifying the list of blobs by including the first blob and the second blob and by removing the identified blob; and outputting the modified list of blobs for the object tracking for the current frame.

In some aspects, when the identified blob is associated with two blob trackers, determining the one or more splitting conditions are met includes: determining a first bounding region of a first blob tracker associated with the identified blob and a second bounding region of a second blob tracker associated with the identified blob encompass at least a threshold amount of foreground pixels of the identified blob; and wherein the identified blob is split into the first blob and the second blob when the first bounding region of the first blob tracker and the second bounding region of the second blob tracker encompass at least the threshold amount of foreground pixels of the identified blob. In some aspects, determining the one or more splitting conditions are met further includes: determining at least a threshold amount of foreground pixels encompassed by the first bounding region of the first blob tracker and the second bounding region of the second blob tracker include foreground pixels of the identified blob; and wherein the identified blob is split into the first blob and the second blob when the first bounding region of the first blob tracker and the second bounding region of the second blob tracker encompass at least the threshold amount of foreground pixels of the identified blob and when at least the threshold amount of foreground pixels encompassed by the first bounding region of the first blob tracker and the second bounding region of the second blob tracker include foreground pixels of the identified blob. A bounding region can include a bounding box (e.g., a rectangle or square), a bounding circle, a bounding ellipse, or any other suitably-shaped region representing a tracker or blob.

In some aspects, when the identified blob is associated with two blob trackers, determining the one or more splitting conditions are met includes: determining a first intersection region between the identified blob and a first bounding region of a first blob tracker associated with the identified blob; determining a second intersection region between the identified blob and a second bounding region of a second blob tracker associated with the identified blob; determining an area of the identified blob; determining an intersection area of the first intersection region and the second intersection region; determining a total area of the first bounding region and the second bounding region; and wherein the identified blob is split into the first blob and the second blob when the intersection area is greater than a threshold amount of the total area and when the total area is greater than a threshold amount of the area of the identified blob. In some aspects, the area of the identified blob includes a number of foreground pixels of the identified blob, wherein the intersection area includes a number of foreground pixels of the identified blob within the first intersection region and the second intersection region, and wherein the total area includes a total number of foreground pixels within the first bounding region and the second bounding region.

In some aspects, when the identified blob is associated with two blob trackers, determining the one or more splitting conditions are met includes: determining a first intersection region between the identified blob and a first bounding region of a first blob tracker associated with the identified blob; determining a second intersection region between the identified blob and a second bounding region of a second blob tracker associated with the identified blob; determining an area of the identified blob; determining an intersection area of the first intersection region and the second intersection region; and wherein the identified blob is split into the first blob and the second blob when the intersection area is greater than a threshold amount of the area of the identified blob. In some aspects, the area of the identified blob includes a number of foreground pixels of the identified blob and wherein the intersection area includes a number of foreground pixels of the identified blob within the first intersection region and the second intersection region.

In some aspects, when the identified blob is associated with more than two blob trackers, the method, apparatuses, and computer readable medium described above further comprise: selecting a first bounding region of a first blob tracker associated with the identified blob as a primary bounding region, the primary bounding region being selected such that a union of remaining bounding regions associated with the identified blob have a smallest size; and combining a second bounding region of a second blob tracker and a third bounding region of a third blob tracker into a combined bounding region, wherein the second blob tracker and the third blob tracker are associated with the identified blob.

In some aspects, the second bounding region and the third bounding region are combined by performing a union operation on the second bounding region and the third bounding region.

In some aspects, determining the one or more splitting conditions are met includes: determining the first bounding region of the first blob tracker and the combined bounding region encompass at least a threshold amount of foreground pixels of the identified blob; and wherein the identified blob is split into the first blob and the second blob when the first bounding region of the first blob tracker and the combined bounding region encompass at least the threshold amount of foreground pixels of the identified blob.

In some aspects, determining the one or more splitting conditions are met further includes: determining at least a threshold amount of foreground pixels encompassed by the first bounding region of the first blob tracker and the combined bounding region include foreground pixels of the identified blob; and wherein the identified blob is split into the first blob and the second blob when the first bounding region of the first blob tracker and the combined bounding region encompass at least the threshold amount of the foreground pixels of the identified blob and when at least the threshold amount of foreground pixels encompassed by the first bounding region of the first blob tracker and the combined bounding region include foreground pixels of the identified blob.

In some aspects, the method, apparatuses, and computer readable medium described above further comprise splitting the combined blob into a third blob and a fourth blob.

In some aspects, the method, apparatuses, and computer readable medium described above further comprise: determining distances between corners of a bounding region of a first blob tracker and corresponding corners of a bounding region of the identified blob; determining a corner of the bounding region of the identified blob with a closest distance to a corresponding corner of the bounding region of the first blob tracker; and shifting the bounding region of the first blob tracker to a new location such that a location of the corresponding corner of the bounding region of the first blob tracker is shifted to a location of the corner of the bounding region of the identified blob.

In some aspects, the method, apparatuses, and computer readable medium described above further comprise: comparing a number of foreground pixels in the shifted bounding region of the first blob tracker to a number of foreground pixels in the bounding region of the first blob tracker before shifting; and maintaining the shifted bounding region of the first blob tracker in the new location when the number of foreground pixels in the shifted bounding region is greater than the number of foreground pixels in the bounding region of the first blob tracker before shifting.

In some aspects, the method, apparatuses, and computer readable medium described above further comprise associating the two or more blob trackers with the identified blob. The associating includes determining an intersection region between a candidate bounding region of a first blob tracker and a bounding region of the identified blob; determining a size ratio, the size ratio including a size of the intersection region over a size of the bounding region of the first blob; determining the size ratio is greater than a minimum size ratio; and determining the first blob tracker is associated with the identified blob when the size ratio is greater than the minimum size ratio.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 11A-FIG. 11D are diagrams illustrating an example of an application of a blob splitting process to a blob associated with multiple tracker bounding boxes, in accordance with some examples.

FIG. 15 is a flowchart illustrating an example of a process of splitting one or more merged blobs for one or more video frames, in accordance with some examples.

FIG. 18A-FIG. 18B is an illustration of video frames of an environment in which objects are detected, in accordance with some examples.

DETAILED DESCRIPTION

Figure 1:
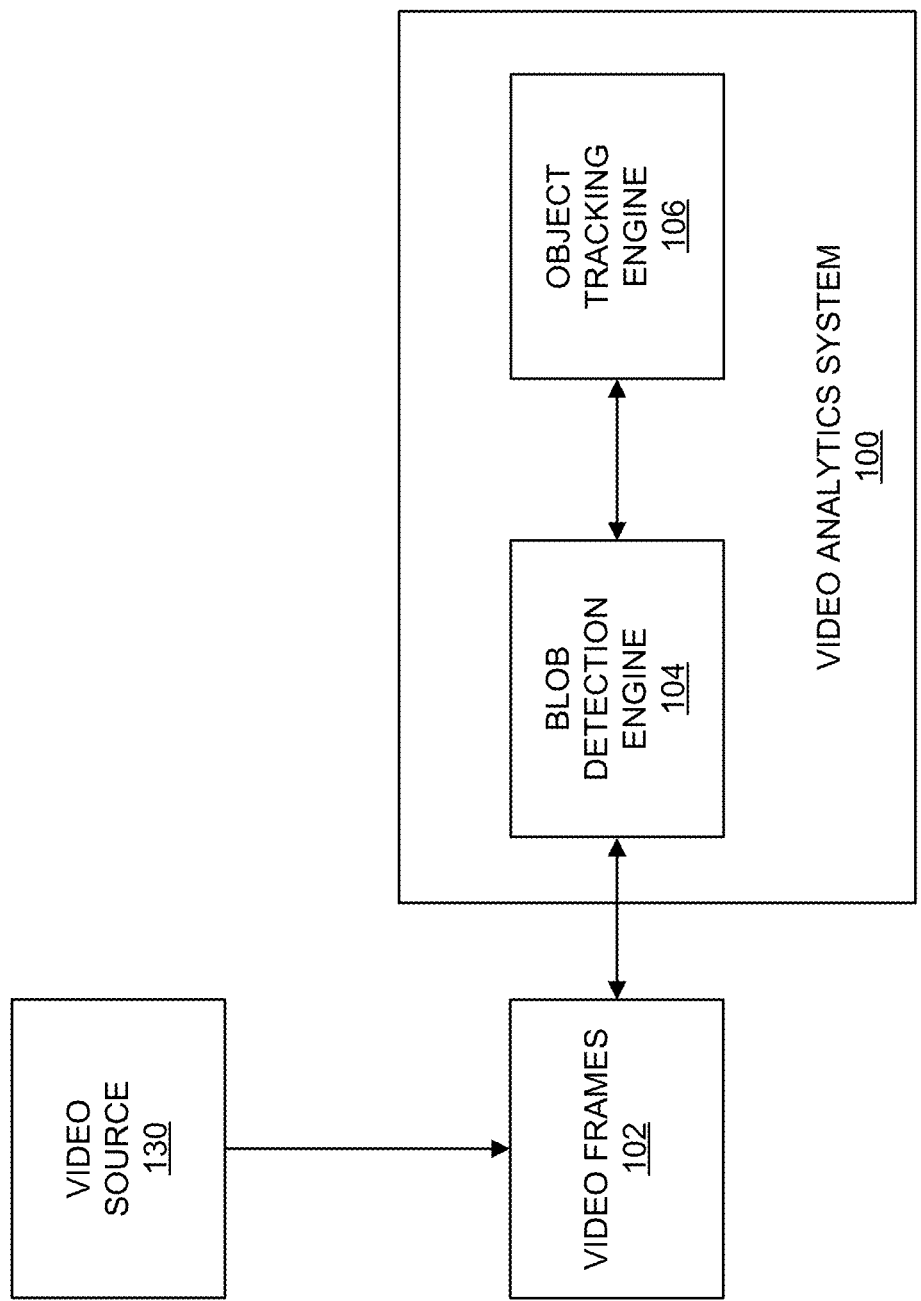
FIG. 1 is a block diagram illustrating an example of a system including a video source and a video analytics system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a sequence of video frames from a video source and can process the video sequence to perform a variety of tasks. One example of a video source can include an Internet protocol camera (IP camera) or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object.

Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of event of interest and sends an alert or alarm to a central control room to alert a user of the event of interest.

As noted previously, a blob detection component of a video analytics system can generate and/or detect foreground blobs that represent at least a portion of a foreground object in a scene. The detected blobs can be used to perform various operations, such as object tracking (also called blob tracking) or other operations described above. As objects move close together in a scene, the blob detection component may detect a single blob for some or all of the objects, causing the objects to become merged into the single blob. Further, blob trackers associated with a merged object (e.g., a first blob tracker associated with a first merged object and a second blob tracker associated with a second merged object) are also merged in such cases. Such a merging of objects and trackers leads to issues when attempting to track the merged objects during and after the merge. As described in more detail below, systems and methods are described herein for splitting merged objects resulting from blob detection before the detected blobs are output to the tracking component of the video analytics system.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking.

The blob detection engine 104 can detect one or more blobs in video frames (e.g., video frames 102) of a video sequence, and the object tracking engine 106 can track the one or more blobs across the frames of the video sequence. As used herein, a blob refers to foreground pixels of at least a portion of an object (e.g., a portion of an object or an entire object) in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding region can be associated with a blob. In some examples, a tracker can also be represented by a tracker bounding region. A bounding region of a blob or tracker can include a bounding box, a bounding circle, a bounding ellipse, or any other suitably-shaped region representing a tracker or blob. While examples are described herein using bounding boxes for illustrative purposes, the techniques and systems described herein can also apply using other suitably shaped bounding regions. A bounding box associated with a tracker and/or a blob can have a rectangular shape, a square shape, or other suitable shape. In the tracking layer, in case there is no need to know how the blob is formulated within a bounding box, the term blob and bounding box may be used interchangeably.

As described in more detail below, blob detection can be performed to segment moving foreground objects from the global static background in a video sequence. In some cases, there are two major steps in blob detection, including background subtraction and blob analysis. For example, blob detection can contain a background subtraction engine that detects foreground pixels and one or more foreground pixel processing engines that process and group the foreground pixels into foreground blobs for tracking purposes. In some cases, background subtraction can be performed to provide a foreground/background mask (referred to herein as a foreground mask) of a current input frame (the current frame being processed), while the blob analysis takes the foreground mask and produces foreground blobs. The foreground blobs can be represented as bounding boxes (e.g., having a rectangular, square, or other suitable shape). In some examples, the blob detection engine 104 and object tracking engine 106 take as input a current frame, and output the metadata of each current frame. The metadata contains a list of bounding boxes (e.g., bounding boxes of the blob trackers, bounding boxes of the detected foreground blobs, or the bounding boxes of the blob trackers and the detected foreground blobs), each with a bounding box identifier (ID). In some cases, the metadata is on a per frame basis, recording the results of the blob detection and tracking engines. Such metadata can be further interrupted, depending on the particular system configuration.

As described in more detail below, blobs can be tracked using blob trackers. A blob tracker can be associated with a tracker bounding box and can be assigned a tracker identifier (ID). In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIGS. 3-4.

Figure 2:
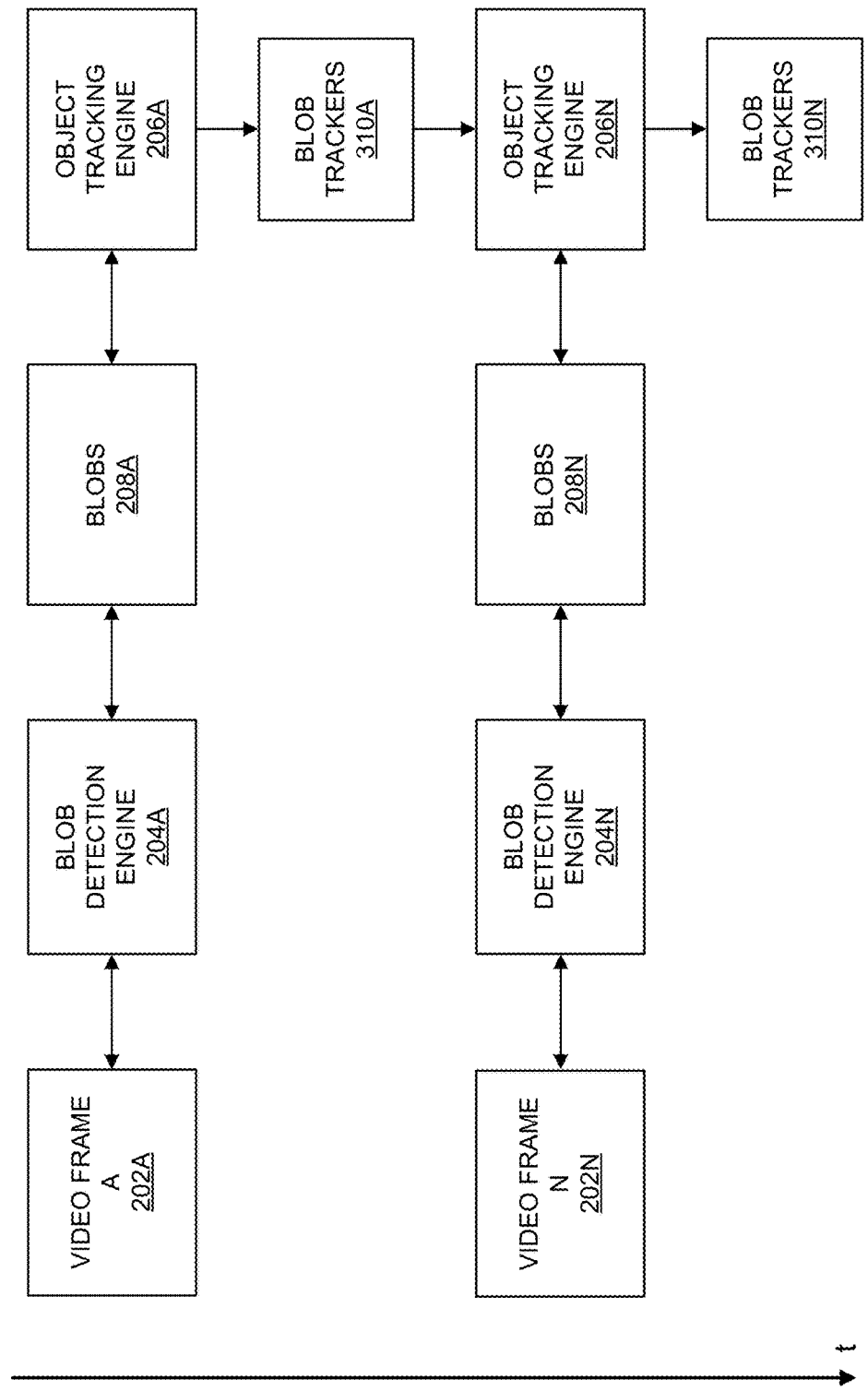
FIG. 2 is an example of a video analytics system processing video frames, in accordance with some examples.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. Costs (e.g., a cost including a distance, a weighted distance, or other cost) between blob trackers and blobs can be calculated by the object tracking engine 206A. The object tracking engine 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
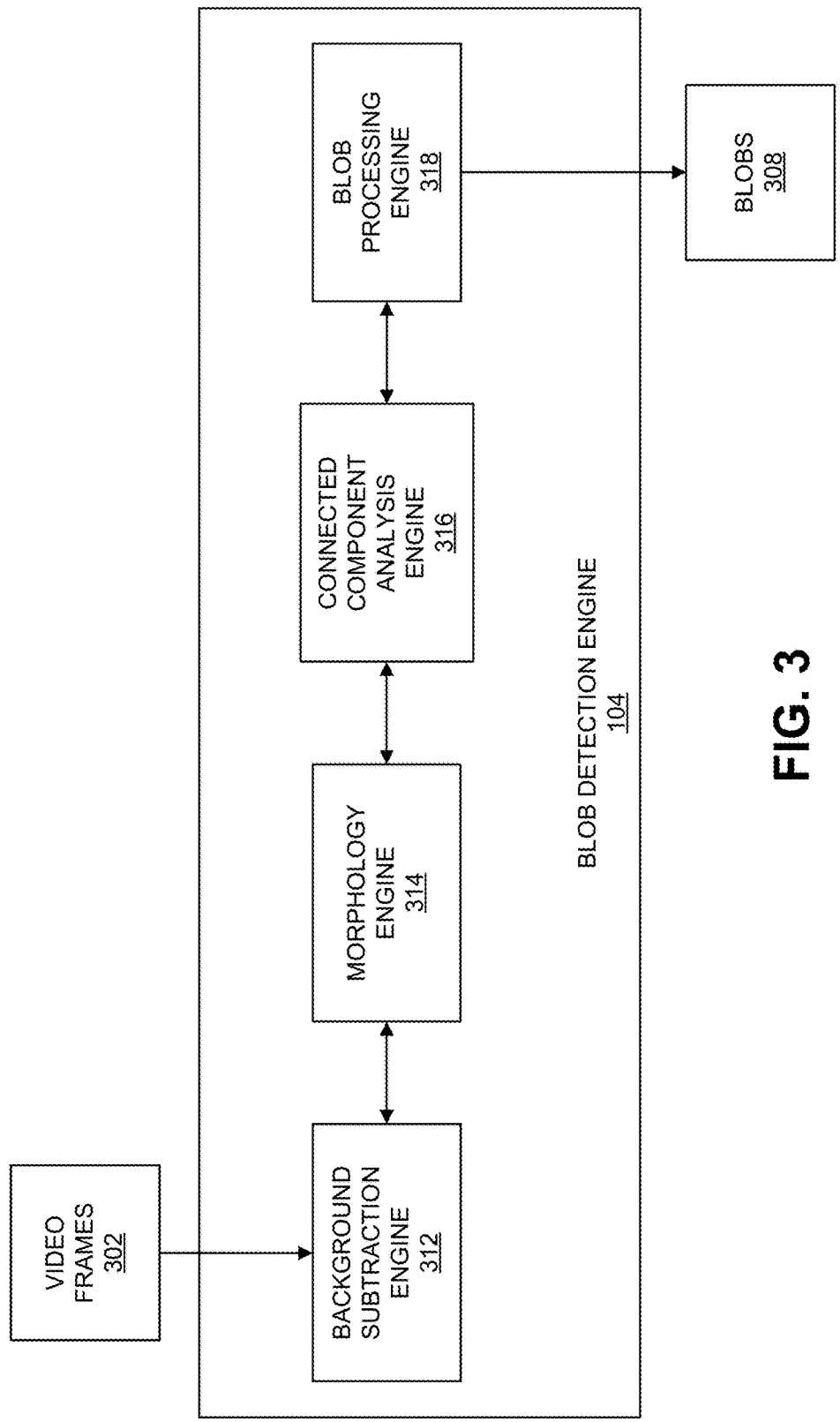
FIG. 3 is a block diagram illustrating an example of a blob detection engine, in accordance with some examples.

FIG. 3 is a block diagram illustrating an example of a blob detection engine 104. Blob detection is used to segment moving objects from the global background in a scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (GMM). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \Sigma_{i,t}) \quad \text{Equation (1)}$$

An equation of the GMM model is shown in equation (1), wherein there are K Gaussian models. Each Guassian model has a distribution with a mean of μ and variance of Σ, and has a weight ω. Here, i is the index to the Gaussian model and t is the time instance. As shown by the equation, the parameters of the GMM change over time after one frame (at time t) is processed. In GMM or any other learning based background subtraction, the current pixel impacts the whole model of the pixel location based on a learning rate, which could be constant or typically at least the same for each pixel location. A background subtraction method based on GMM (or other learning based background subtraction) adapts to local changes for each pixel. Thus, once a moving object stops, for each pixel location of the object, the same pixel value keeps on contributing to its associated background model heavily, and the region associated with the object becomes background.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. In some implementation of connected component analysis, a set of bounding boxes are returned in a way that each bounding box contains one component of connected pixels. One example of the connected component analysis performed by the connected component analysis engine 316 is implemented as follows:

```
for each pixel of the foreground mask {
-if it is a foreground pixel and has not been processed, the following
steps apply:
    -Apply FloodFill function to connect this pixel to other foreground
    and generate a connected component
    -Insert the connected component in a list of connected components.
    -Mark the pixels in the connected component as being processed }
```

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, there may be a filtering process for the connected components (bounding boxes). For instance, the blob processing engine 318 can perform content-based filtering of certain blobs. In some cases, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some cases, the blob processing engine 318 can filter out one or more small blobs that are below a certain size threshold (e.g., an area of a bounding box surrounding a blob is below an area threshold). In some examples, there may be a merging process to merge some connected components (represented as bounding boxes) into bigger bounding boxes. For instance, the blob processing engine 318 can merge close blobs into one big blob to remove the risk of having too many small blobs that could belong to one object. In some cases, two or more bounding boxes may be merged together based on certain rules even when the foreground pixels of the two bounding boxes are totally disconnected. In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

In some implementations, density based blob area trimming may be performed by the blob processing engine 318. For example, when all blobs have been formulated after post-filtering and before the blobs are input into the tracking layer, the density based blob area trimming can be applied. A similar process is applied vertically and horizontally. For example, the density based blob area trimming can first be performed vertically and then horizontally, or vice versa. The purpose of density based blob area trimming is to filter out the columns (in the vertical process) and/or the rows (in the horizontal process) of a bounding box if the columns or rows only contain a small number of foreground pixels.

The vertical process includes calculating the number of foreground pixels of each column of a bounding box, and denoting the number of foreground pixels as the column density. Then, from the left-most column, columns are processed one by one. The column density of each current column (the column currently being processed) is compared with the maximum column density (the column density of all columns). If the column density of the current column is smaller than a threshold (e.g., a percentage of the maximum column density, such as 10%, 20%, 30%, 50%, or other suitable percentage), the column is removed from the bounding box and the next column is processed. However, once a current column has a column density that is not smaller than the threshold, such a process terminates and the remaining columns are not processed anymore. A similar process can then be applied from the right-most column. One of ordinary skill will appreciate that the vertical process can process the columns beginning with a different column than the left-most column, such as the right-most column or other suitable column in the bounding box.

The horizontal density based blob area trimming process is similar to the vertical process, except the rows of a bounding box are processed instead of columns. For example, the number of foreground pixels of each row of a bounding box is calculated, and is denoted as row density. From the top-most row, the rows are then processed one by one. For each current row (the row currently being processed), the row density is compared with the maximum row density (the row density of all the rows). If the row density of the current row is smaller than a threshold (e.g., a percentage of the maximum row density, such as 10%, 20%, 30%, 50%, or other suitable percentage), the row is removed from the bounding box and the next row is processed. However, once a current row has a row density that is not smaller than the threshold, such a process terminates and the remaining rows are not processed anymore. A similar process can then be applied from the bottom-most row. One of ordinary skill will appreciate that the horizontal process can process the rows beginning with a different row than the top-most row, such as the bottom-most row or other suitable row in the bounding box.

One purpose of the density based blob area trimming is for shadow removal. For example, the density based blob area trimming can be applied when one person is detected together with his or her long and thin shadow in one blob (bounding box). Such a shadow area can be removed after applying density based blob area trimming, since the column density in the shadow area is relatively small. Unlike morphology, which changes the thickness of a blob (besides filtering some isolated foreground pixels from formulating blobs) but roughly preserves the shape of a bounding box, such a density based blob area trimming method can dramatically change the shape of a bounding box.

Figure 4:
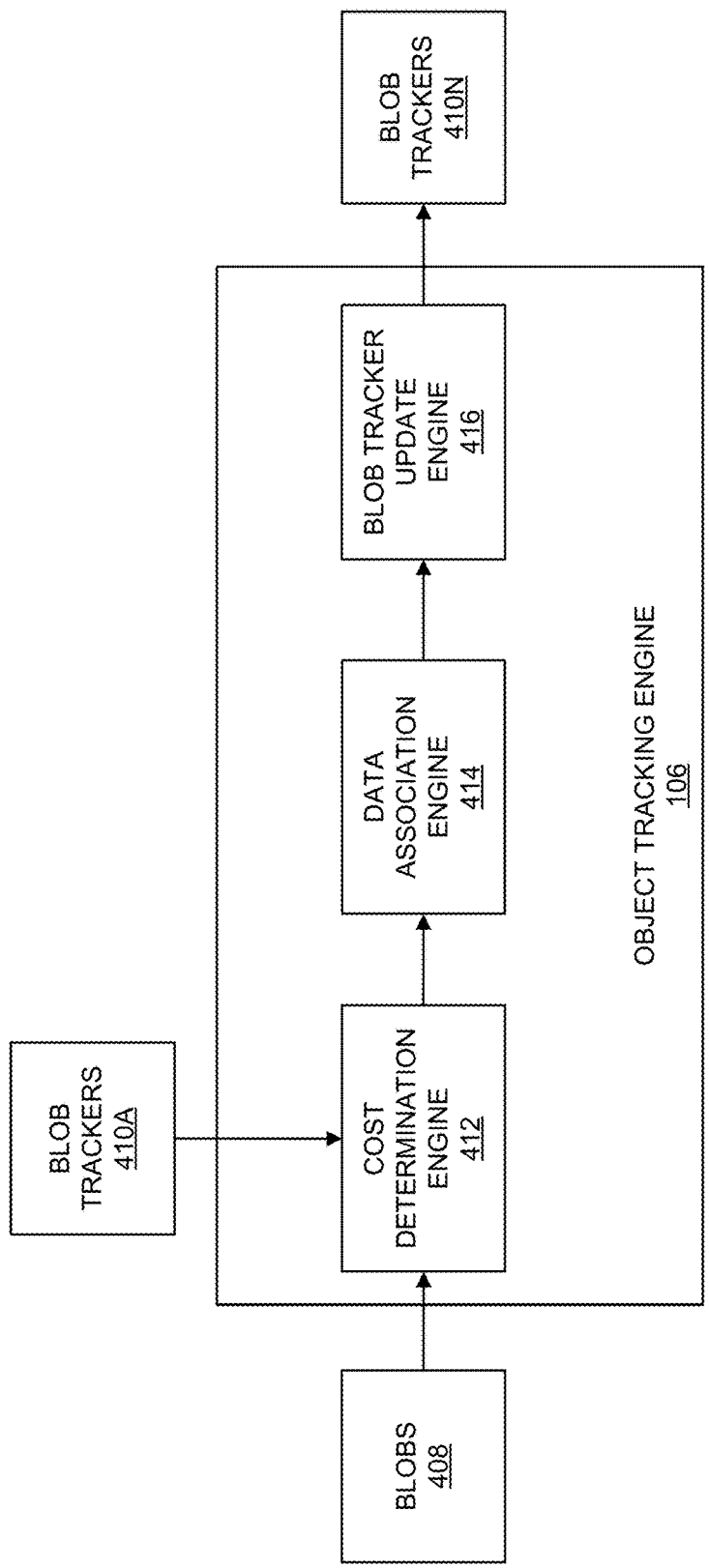
FIG. 4 is a block diagram illustrating an example of an object tracking engine, in accordance with some examples.

Once the blobs are detected and processed, object tracking (also referred to as blob tracking) can be performed to track the detected blobs. FIG. 4 is a block diagram illustrating an example of an object tracking engine 106. The input to the blob/object tracking is a list of the blobs 408 (e.g., the bounding boxes of the blobs) generated by the blob detection engine 104. In some cases, a tracker is assigned with a unique ID, and a history of bounding boxes is kept. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A). A cost function can then be used to calculate costs between the object trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x - b_x)^2 + (t_y - b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker (or tracker bounding box) with a corresponding blob (or blob bounding box) and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible. Regardless of the association technique that is used, the data association engine 414 can rely on the distance between the blobs and trackers.

Once the association between the blob trackers 410A and blobs 408 has been completed, the blob tracker update engine 416 can use the information of the associated blobs, as well as the trackers' temporal statuses, to update the status (or states) of the trackers 410A for the current frame. Upon updating the trackers 410A, the blob tracker update engine 416 can perform object tracking using the updated trackers 410N, and can also provide the updated trackers 410N for use in processing a next frame.

The status or state of a blob tracker can include the tracker's identified location (or actual location) in a current frame and its predicted location in the next frame. The location of the foreground blobs are identified by the blob detection engine 104. However, as described in more detail below, the location of a blob tracker in a current frame may need to be predicted based on information from a previous frame (e.g., using a location of a blob associated with the blob tracker in the previous frame). After the data association is performed for the current frame, the tracker location in the current frame can be identified as the location of its associated blob(s) in the current frame. The tracker's location can be further used to update the tracker's motion model and predict its location in the next frame. Further, in some cases, there may be trackers that are temporarily lost (e.g., when a blob the tracker was tracking is no longer detected), in which case the locations of such trackers also need to be predicted (e.g., by a Kalman filter). Such trackers are temporarily not shown to the system. Prediction of the bounding box location helps not only to maintain certain level of tracking for lost and/or merged bounding boxes, but also to give more accurate estimation of the initial position of the trackers so that the association of the bounding boxes and trackers can be made more precise.

As noted above, the location of a blob tracker in a current frame may be predicted based on information from a previous frame. One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, the state or status of a tracker can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., 2 or more), or other suitable tracker states.

There may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

Regardless of the tracking method being used, a new tracker starts to be associated with a blob in one frame and, moving forward, the new tracker may be connected with possibly moving blobs across multiple frames. When a tracker has been continuously associated with blobs and a duration has passed, the tracker may be promoted to be a normal tracker. A normal tracker is output as an identified tracker-blob pair. For example, a tracker-blob pair is output at the system level as an event (e.g., presented as a tracked object on a display, output as an alert, or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by rule interpreter). A tracker that is not promoted as a normal tracker can be removed (or killed), after which the tracker can be considered as dead.

As described above, blob detection can be performed for one or more video frames capturing a scene to detect blobs representing one or more objects for the one or more video frames. The detected blobs can then be tracked by a tracking engine. In some cases, objects in the scene can move close together, in which case blob detection may detect a single blob for the objects. Multiple objects that are detected as a single blob are referred to as merged objects (e.g., two objects being merged together in a single blob). After blob analysis produces bounding boxes with one blob containing multiple merged objects, the tracking engine will try to match that single blob with existing trackers. Such a scenario can lead to a "merge" at the tracking level, in which case blob trackers (and the bounding boxes of the trackers) associated with the objects are merged together. For example, a merge may occur between a first blob tracker associated with a first object merged into the single blob and a second blob tracker associated with a second merged object merged into the single blob. The "merge" status of the multiple merged objects will continue until at least two of the objects are separated enough so that blob detection detects one of the cars individually. A split occurs when merged objects are later detected as individual objects. In one illustrative example, a single blob may be detected for two people that are walking closely together, and the individual trackers previously tracking the blobs for the two people are merged together. The merged blob may later be split into two or more blobs when the two people start walking in different directions, in which case two separate blobs are detected for the two people. This type of split that based on positions of objects in the scene is a different type of split than the splitting techniques described herein. As described in more detail below, the blob splitting (or object splitting) techniques described herein operate to split a merged blob bounding box (containing multiple objects) before the blob bounding box is output to the tracking engine.

FIG. 5A-FIG. 5E show video frames capturing images of a scene in which objects are detected and trackers for the objects are merged together. In the frame (with frame number 488) shown in FIG. 5A, a tracker with ID equal to 27 (shown as bounding box 502) is tracking first and second cars and a tracker with ID equal to 33 (shown as bounding box 504) is tracking a third car. As shown in the frame (with frame number 489) of FIG. 5B, the tracker 27 with bounding box 502 and the tracker 33 with bounding box 504 are merged together once the three cars are close to each other. The result is a single tracker 27 with bounding box 502 being used to track all three cars. The "merge" status of the trackers 27 and 33 will continue until at least two of the cars are separated enough so that blob detection detects one of the cars individually. In such an example, the trackers 27 and 33 might not be properly maintained, resulting in poor tracking accuracy of the video analytics system. For example, when trackers are merged together, the tracking accuracy drops significantly for the relevant trackers. As one illustrative example, predicted locations of the trackers may not be updated at each frame, causing a drop in tracking accuracy. Further, trackers may not be converted back to normal tracker status until the associated blob bounding boxes are detected as separated by blob detection.

Figure 5A:
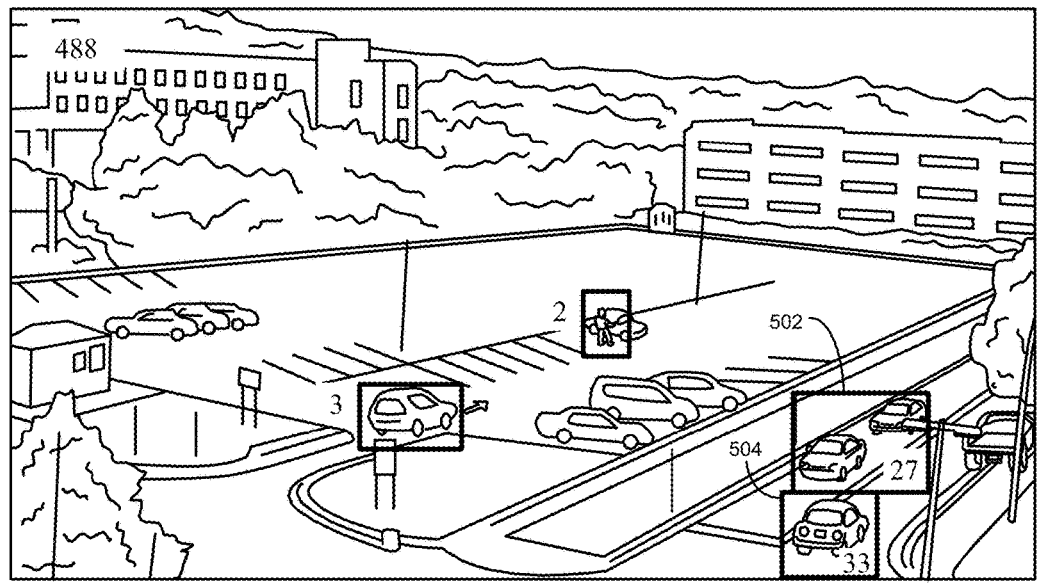
FIG. 5A-FIG. 5E are illustrations of video frames of an environment in which objects are detected and trackers for the objects are merged together, in accordance with some examples.
Figure 5B:
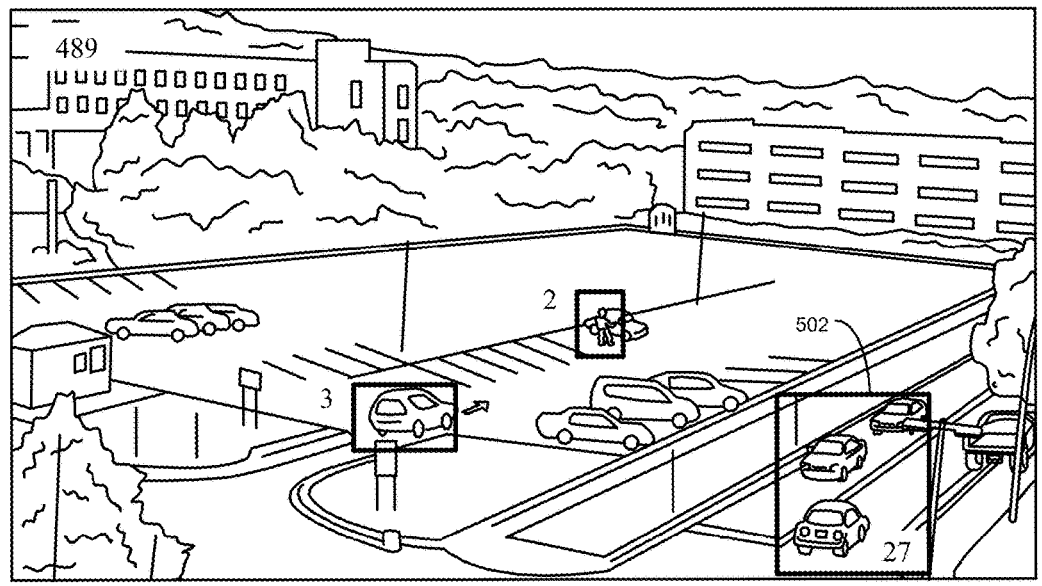
Figure 5C:
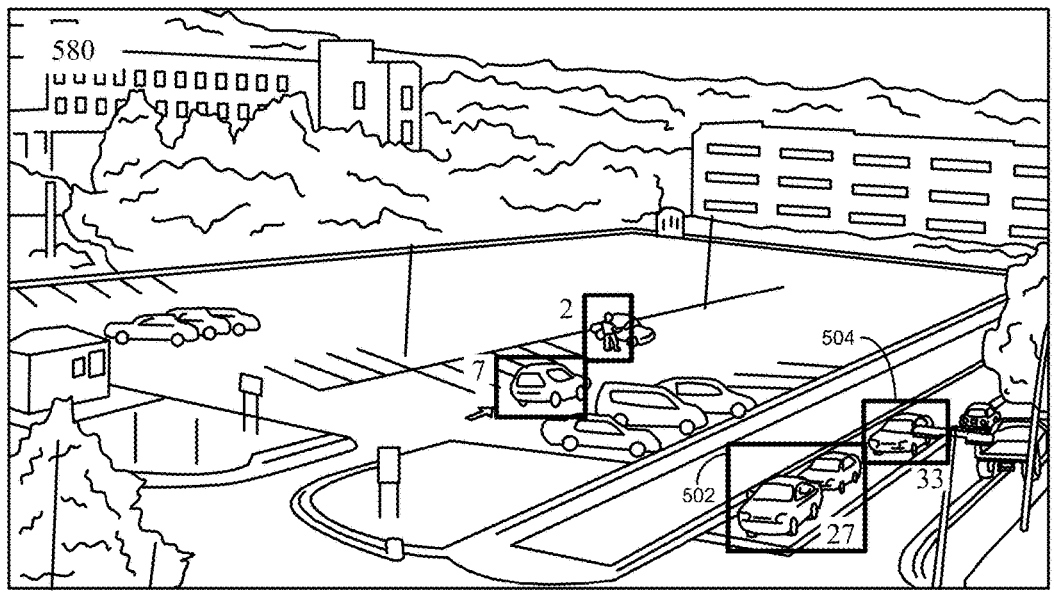
Figure 5D:
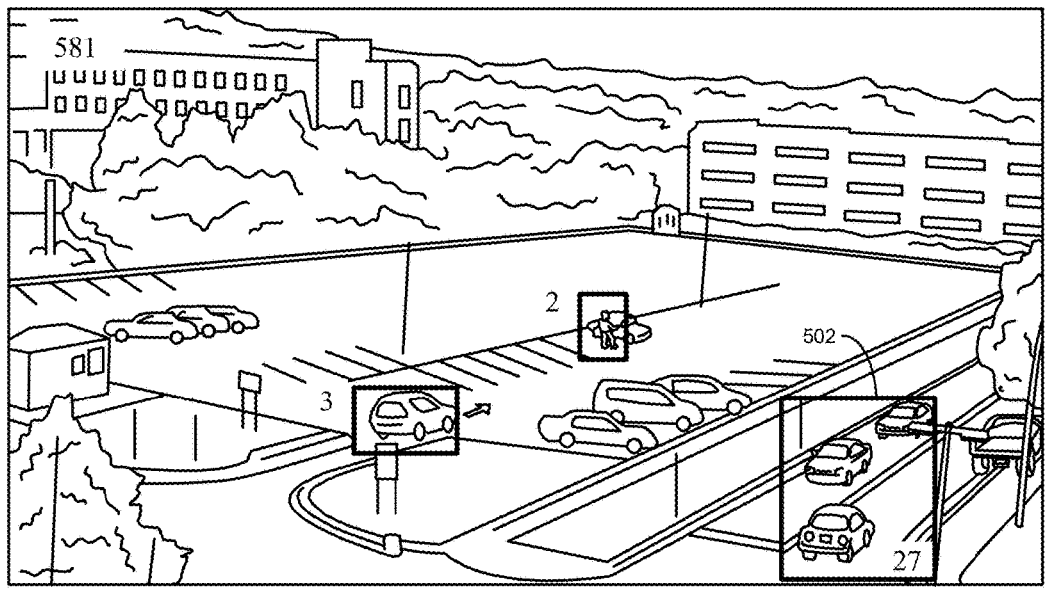
Figure 5E:
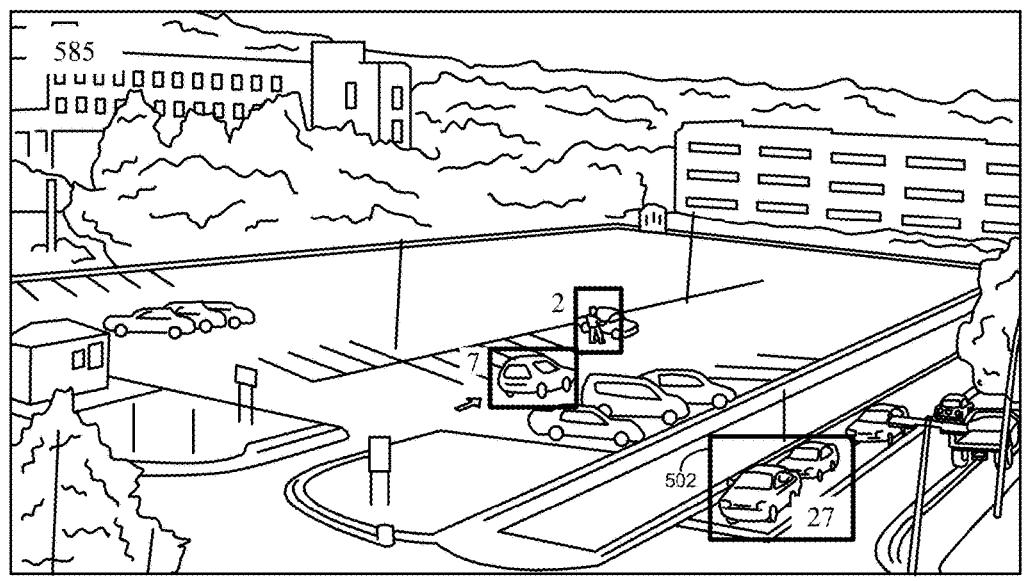

As shown in the frame of FIG. 5C (with frame number 580) and the frame of FIG. 5D (with frame number 581), a very small differences in individual bounding boxes of trackers can cause significantly different results of two trackers being merged together or not. For example, in FIG. 5C, the tracker 27 with bounding box 502 is tracking two cars, while a fourth car is now tracked by the tracker 33 with bounding box 504. One frame later (in frame with number 581 shown in FIG. 5D), the fourth car comes slightly closer to the first and second cars, causing all three cars to be merged and tracked by the tracker 27 with bounding box 502. Such temporal inconsistency makes the future re-identification of the proper tracker-blob pairs after splitting inaccurate because the predictions of the undetected (un-matched) tracker locations or positions will be compromised. In one example, a possible side effect of too much merging is shown in FIG. 5E, where the fourth car (previously tracked by tracker 33 with bounding box 504) is not tracked by any tracker after splitting from the first and second cars. In another example (not shown), both trackers 27 and 33 can be used to track the three cars immediately after splitting, but the tracker ID can be accidentally swapped by the tracking system. For instance, instead of the tracker 27 (bounding box 502) tracking the first and second cars and the tracker 33 (bounding box 504) tracking the fourth car, the tracker 33 will track the first and second cars and the tracker 27 will track the fourth car.

In some cases, it is possible to perform a less aggressive blob merging as part of the blob detection and analysis, or to even perform no merge at all. However, such a solution would make it difficult or even impossible to detect objects that have similar characteristics as the background. For example, an object may have two parts that are detected as separate blobs due to the limitations of background subtraction. In one illustrative example, a person may have a belt that is the same color as the background, causing the belt to be detected as background, a first blob to be detected for the person's upper body, and a second blob to be detected for the person's lower body.

In some cases, it may be possible to have more advanced techniques to address object and tracker merging (e.g., a person/object detection tool to pick up each individual object from a blob). For example, such techniques may analyze pixel level information to determine individual objects in a blob. However, such techniques are very expensive and thus not suitable to be applied to each bounding box of the blob/object detection output.

Methods and systems are described herein for splitting merged objects that are encompassed within a single bounding box as a result of blob detection. For example, a blob bounding box containing multiple merged objects can be split into multiple individual bounding boxes representing the individual objects. The blobs and associated bounding boxes from blob detection can be analyzed and possibly split before the bounding boxes are output to the tracking engine. In some cases, a modified list of blobs and bounding boxes can be output to the tracking engine. The blob splitting methods and systems can process the bounding boxes of blobs and trackers, with very limited need to access pixel level information. For example, in some cases, pixel information (e.g., an appearance model of an object, blob, or tracker) may not be used for tracking or for the splitting decision. As a result, the methods and systems have a low complexity and add a negligible complexity increase (or delay) to the video analytics system. As described in more detail below, the bob splitting techniques can handle cases in which two objects are merged, and also cases when three or more objects are merged. The techniques can also tolerate a large percentage of overlap between two objects.

In some implementations, the blob splitting methods and systems described herein work with the several assumptions. For example, it can be assumed that an object will have a relatively continuous and smooth trajectory (or velocity) even if it has been merged with other objects. With an object having continuous and smooth trajectory, the location and velocity of an object, after being merged, are more predictable. Further, it can be assumed that the merging of an object occurs for a small part of the life cycle of the whole object, and it can be expected that the duration of the merge status of an object will not be long. For example, the blob splitting techniques can handle the merging for various periods of time (e.g., 2 seconds, 10 second, even 30 seconds, or longer). The results may vary for very long periods of time. It can also be assumed that the size of a merged object, while it is merged, will not change significantly, and thus a merged object can be assumed to be almost rigid. As noted above, the blob splitting techniques described herein can handle cases when objects occlude each other (e.g., there is overlap between two or more merged objects).

Figure 6:
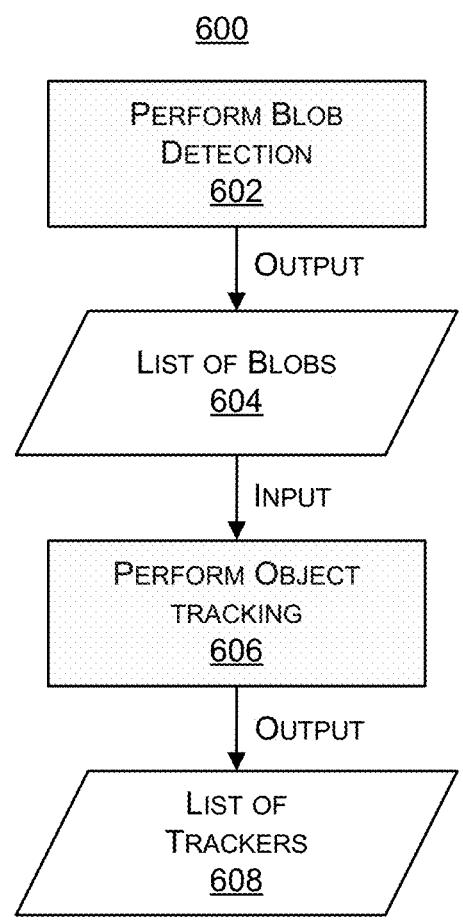
FIG. 6 is a flowchart illustrating an example of a blob detection and tracking process.

A conventional blob detection and object tracking process is shown in FIG. 6. As shown in FIG. 6, the process 600 includes performing blob detection at step 602. For example, a blob detection engine can output a list of blobs 604. The blobs in the list of blobs 604 can then be used as input by an object tracking engine. For example, at step 606, the process 600 includes performing object tracking. The list of blobs 604 can include one or more merged blobs with each merged blob containing two or more merged objects, which can lead to the problems described above. The output of the object tracking is the list of trackers 608. The trackers 608 may also be in the form of bounding boxes with tracker IDs.

Figure 7:
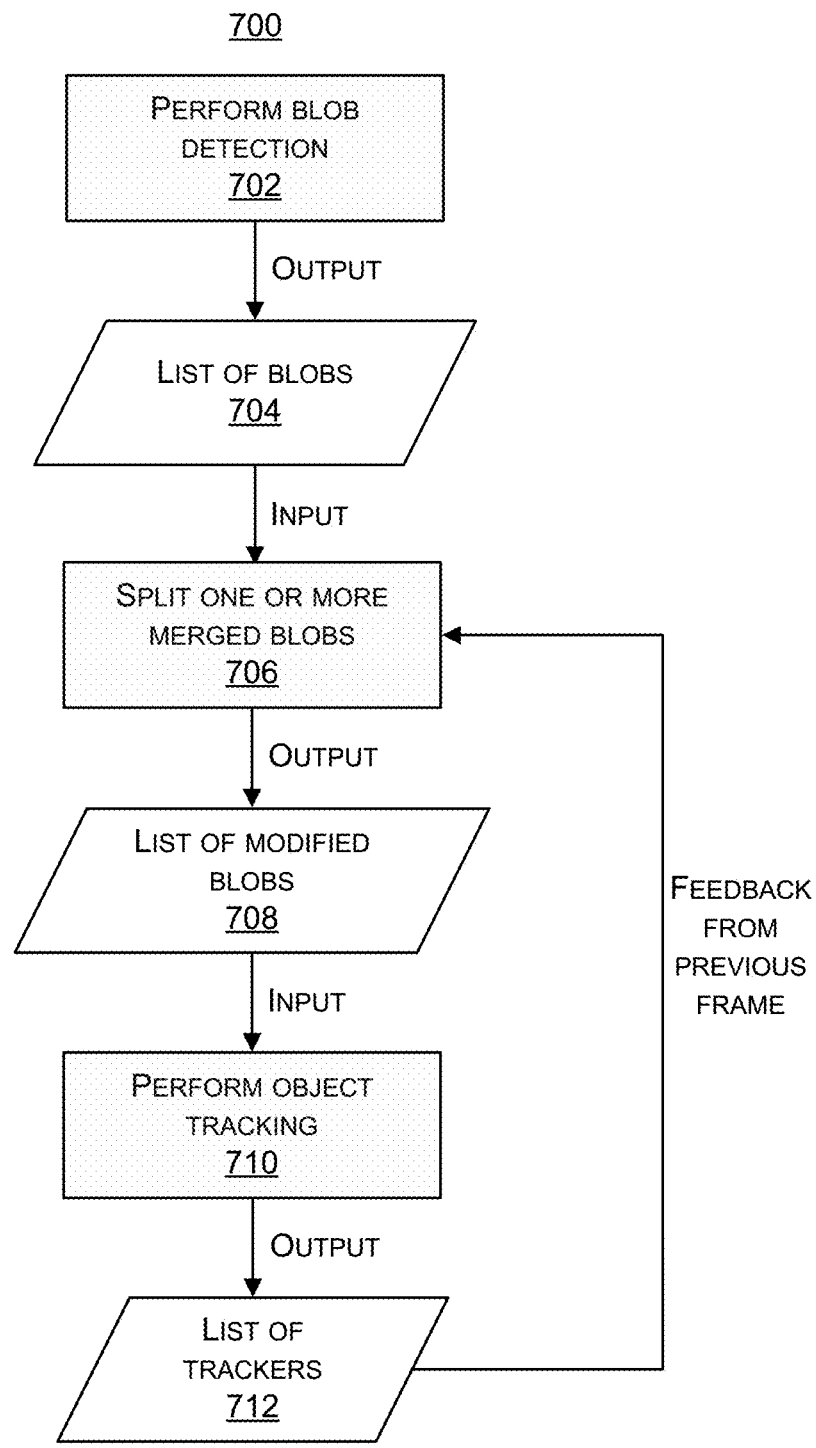
FIG. 7 is a flowchart illustrating an example of a blob detection and tracking process with blob splitting, in accordance with some examples.

FIG. 7 illustrates an example of a blob detection and tracking process 700 with blob splitting. At 702, the process 700 includes performing blob detection for a current frame. For example, a blob detection engine (e.g., blob detection engine 104) can generate or detect the blobs from the current frame using the blob detection techniques described above. As used herein, the frame currently being processed is referred to as the current frame. The blob detection engine can output the list of blobs 704 as a result of the blob detection performed at step 702. The list of blobs 704 can include the bounding boxes associated with the blobs or can include the actual blobs. The list of blobs 704 can include at least one merged blob containing two or more merged objects.

At step 706, a blob splitting process can be performed on the list of blobs 704 to split one or more merged blobs into two or more bounding boxes. For example, a blob splitting system (e.g., blob splitting system 820 described with respect to FIG. 8) can receive the list of blobs 704 from the blob detection engine and can also receive a list of blob trackers 712 as feedback from the output of the object tracking engine based on object tracking performed for a previous frame. The blobs detected for the current frame and the blob trackers from the previous frame can be used to possibly split at least one of the blobs into two or more blobs, and/or can determine that one or more of the blobs should not be split. In some cases, as described below, the blob splitting system can also receive and use a background-foreground mask generated for the current frame (e.g., generated using a background subtraction engine) to split one or more of the blobs from the list of blobs 704. The foreground mask can be used as a reference point so that tracker bounding boxes can be compared to the various blob bounding boxes.

The blob trackers 712 that are fed back to the blob splitting system can include blob trackers resulting from object tracking performed on a previous frame. For example, the predicted location of a blob tracker bounding box for a current frame can be used, which is based on a previous location of the tracker in a previous frame. For instance, as described above, the predicted location of a blob tracker in a current frame can include a location in a previous frame of a blob with which the blob tracker was associated.

The list of blobs 704 output from the blob detection engine can be modified by the blob splitting system based on the results of step 706. For example, the blob splitting system can generate a new list of modified blobs 708. Such a new list of blobs are called a modified list of blobs since the original list output from the object tracking engine is modified when a blob bounding box containing merged objects is split into multiple bounding boxes. The list of modified blobs 708 are output to the object tracking engine, which performs object tracking on the current frame at step 710 using the techniques described above. After object tracking is performed at step 710, a list of trackers 712 is generated and can be output for use in a subsequent iteration of the process 700 (e.g., for a next frame) as well as for other video analytics functions, as described above. The list of trackers 712 can include the bounding boxes of the trackers and the tracker IDs for the trackers to which the bounding boxes are assigned.

During the blob splitting process 700, a blob may be split into two blobs, three blobs, or even more blobs when certain conditions are met. In some cases, it is possible that some blobs will not be split into two or more blobs. For example, in most of the cases when a merge has not happened, each blob is not modified and the list of blobs 704 is kept the same even after the blob splitting process is performed at step 706. Further details on the blob splitting system and process are described below.

Figure 8:
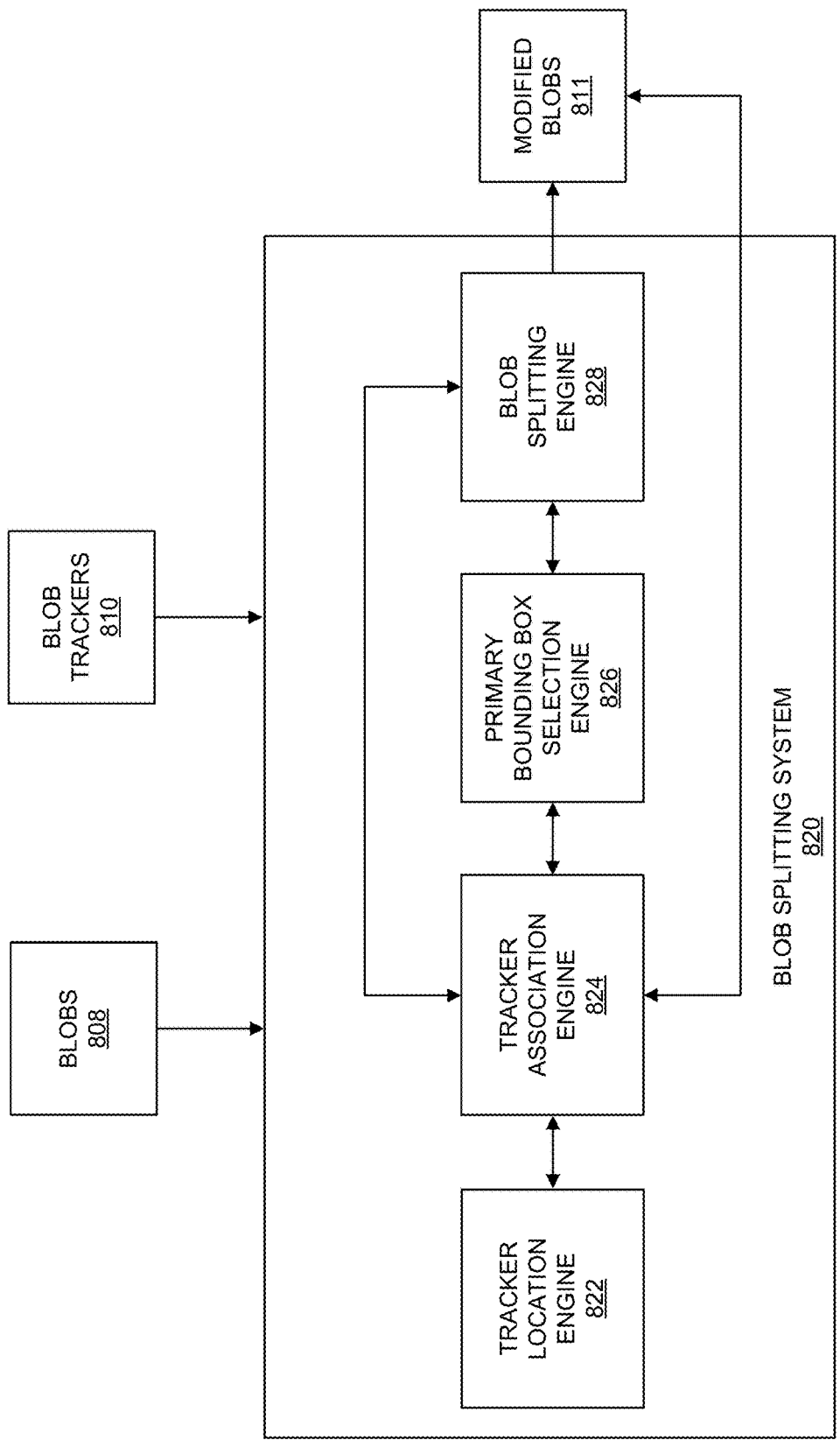
FIG. 8 is a block diagram illustrating an example of a blob splitting system, in accordance with some examples.

FIG. 8 shows an example of a blob splitting system 820 that can be used to perform a blob splitting process (e.g., step 706 of process 700). The blob splitting system 820 includes a tracker location engine 822, a tracker association engine 824, a primary bounding box selection engine 826, and a blob splitting engine 828. The blob splitting system 820 receives as input the blobs 808 and the blob trackers 810. The blobs 808 correspond to the list of blobs 704 shown in FIG. 7, and can include the blob bounding boxes or the blobs themselves. The blob trackers 810 correspond to the list of trackers 712 shown in FIG. 7, and can include the bounding boxes of the trackers and the tracker IDs for the trackers that are assigned to the bounding boxes. The blob splitting process can be performed by the blob splitting system 820 on each blob that is detected for a current frame being processed. For example, when the blob splitting process is performed on a current frame, the blobs 808 can include the blobs (e.g., the blob bounding boxes) detected for the current frame. When the blobs 808 include the blobs detected for a current frame of a video sequence, the blob trackers 810 can include predicted bounding boxes of the blob trackers (and the tracker IDs) predicted from a previous frame of the video sequence.

In some examples, the input to the blob splitting system 820 for the current frame can also include a background-foreground mask (also referred to herein as a foreground mask) generated for the current frame, in addition to the blobs 808 and the blob trackers 810. In some cases, when analyzing a particular blob, the blob splitting system 820 can use the relevant trackers (e.g., the tracker bounding boxes) associated with that blob and the foreground mask as input. In some examples, all trackers that are associated or matched with detected blobs in the previous frame are considered as inputs to the blob splitting system 820. Alternatively, only those trackers that have been used for output (normal trackers) will be considered as inputs to the blob splitting system 820.

The output of the blob splitting system 820 includes the modified blobs 811, which corresponds to the list of modified blobs 708 shown in FIG. 7. The modified blobs 811 can be output to an object tracking engine (e.g., object tracking engine 106) for performing object tracking on the current frame. The object tracking engine can thus perform object tracking for the current frame based on the modified blobs 811 (with one or more blob bounding boxes resulting from one or more previously merged blobs being split) instead of the original list of blobs 808 output from the blob detection engine.

Figure 9:
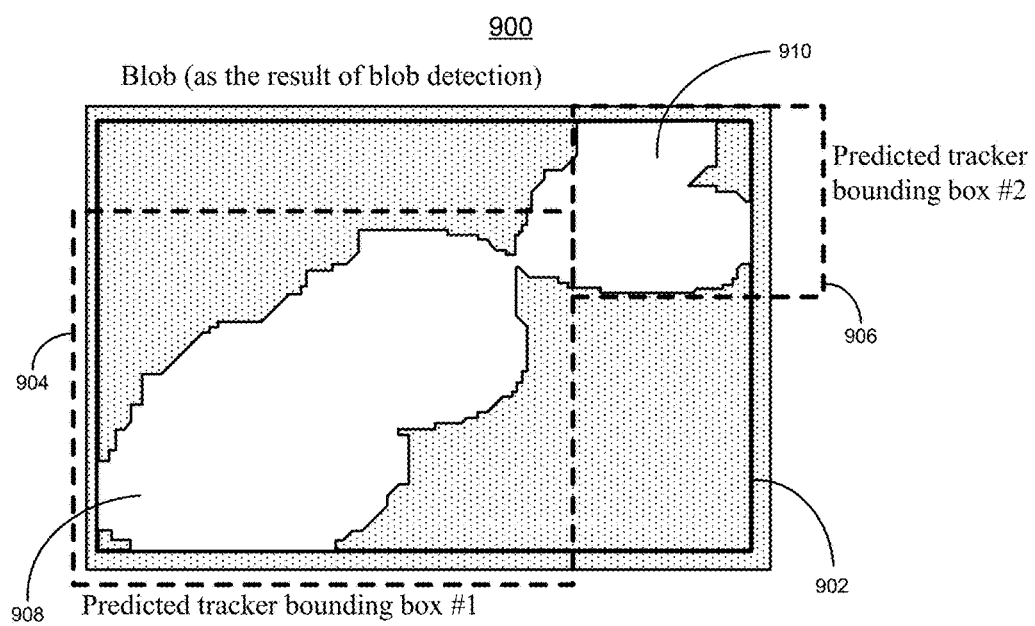
FIG. 9 is a diagram illustrating an example of a portion of a background-foreground mask with a merged blob representing merged objects, in accordance with some examples.

As noted above, the blob splitting process is performed on a blob-by-blob basis for a current frame that is being processed by the blob splitting system 820. For example, the blob splitting system 820 analyzes each blob of the list of blobs detected for the current frame. When analyzing a current blob, the blob splitting system 820 can use the foreground mask for the current frame, the bounding box of the current blob, and the bounding boxes of the blob trackers 810 fed back from object tracking performed on a previous frame. FIG. 9 illustrates an example of a cropped portion of a foreground mask 900 with a merged blob 902 (shown as merged blob bounding box) that includes two blobs 908 and 910 merged together into one. The merged blob 902 includes a first blob 908 that represents a first object and a second blob 910 that represents a second object. The first and second objects are merged together due to the blob detection engine detecting and outputting the single merged blob 902 for the two objects.

To begin processing a current blob, the tracker location engine 822 can predict or determine locations of the trackers 810 in the current frame and the tracker association engine 824 can determine the one or more trackers (bounding boxes) from the trackers 810 that are associated with the current blob being processed. In some cases, the tracker location engine 822 can determine or predict locations of the trackers 810 in the current frame using predicted locations of the trackers 810 predicted using information from a previous frame. For example, assuming that two trackers are not merged yet in the previous frame (e.g., the frame immediately before the current frame, or another previous frame), each of the tracker bounding boxes can be predicted with a relatively new tracker location in the current frame (e.g., using a Kalman filter, as described above). For instance, the predicted location of the tracker (determined using a location of a blob associated with the tracker in the previous frame) can be used as the new location of the tracker in the current frame. In some cases, a velocity of the tracker may also be taken into account when determining the predicted location (e.g., the location of the tracker bounding box may be moved in the current frame relative to its location in a previous frame according to its velocity or trajectory). In some cases, the predicted location of the trackers 810 can be determined and output to the blob splitting system 820 from the object tracking engine in cases when tracker location information is updated as part of the object tracking process.

Using FIG. 9 as an example of a foreground mask for a current frame, the tracker bounding box 904 can be associated with a blob representing the first object (represented by the blob 908 in the current frame) in the previous frame and the tracker bounding box 906 can be associated with a blob representing the second object (represented by the blob 910 in the current frame) in the previous frame. The location of the first blob in the previous frame can be used as the predicted location of the tracker bounding box 904 in the current frame, and the location of the second blob in the previous frame can be used as the predicted location of the tracker bounding box 906 in the current frame.

The tracker association engine 824 can identify one or more associated trackers for the current blob and/or the blob's bounding box. In some examples, a tracker associated with a current blob can be identified using the geometry information of the bounding box associated with the tracker (e.g., after prediction) as well as the bounding box of the current blob. In one illustrative example, the tracker association engine 824 can calculate an intersection between the candidate bounding box of a candidate tracker and the bounding box of the current blob. The intersection is also referred to herein as an intersection region or an intersecting region.

Figure 10:
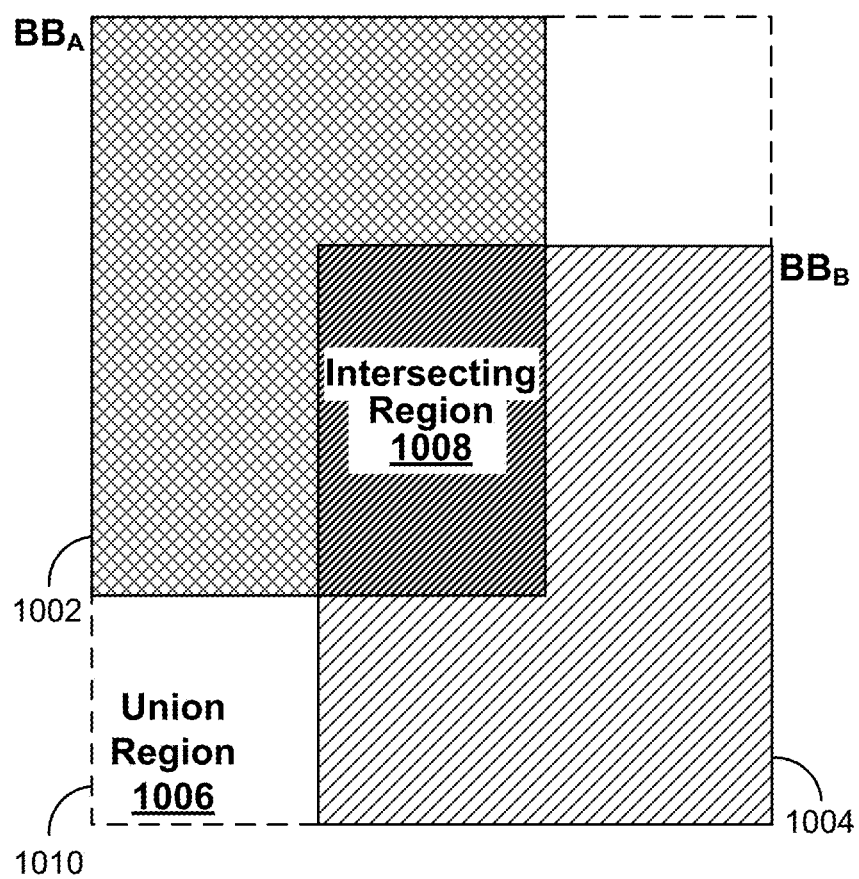
FIG. 10 is a diagram illustrating an example of an intersection and union of two bounding boxes, in accordance with some examples.

FIG. 10 shows an example of an intersection I and union U of two bounding boxes, including a bounding box $BB_A$ 1002 of the current blob in the current frame and a bounding box $BB_B$ 1004 of the candidate tracker in the current frame. The intersecting region 1008 includes the overlapped region between the bounding box $BB_A$ 1002 and the bounding box $BB_B$ 1004.

The union region 1006 includes the union of bounding box $BB_A$ 1002 and bounding box $BB_B$ 1004. The union of bounding box $BB_A$ 1002 and bounding box $BB_B$ 1004 is defined to use the far corners of the two bounding boxes to create a new bounding box 1010 (shown as the dotted line). More specifically, by representing each bounding box with (x, y, w, h), where (x, y) is the upper-left coordinate of a bounding box, w and h are the width and height of the bounding box, respectively, the union of the bounding boxes would be represented as follows:

$$\text{Union}(BB_A, BB_B) = (\min(x_1,x_2), \min(y_1,y_2), (\max(x_1 + w_1 - 1, x_2 + w_2 - 1) - \min(x_1,x_2)), (\max(y_1 + h_1 - 1, y_2 + h_2 - 1) - \min(y_1,y_2)))$$

The tracker association engine 824 can determine a size ratio of the intersection of the blob and candidate tracker bounding boxes over a size of the current blob bounding box (denoted as $$SR = \frac{BB_A \cup BB_B}{BB_A}).$$

It the size ratio is larger than a minimum size ratio (or equal to in some cases), the candidate bounding box and its tracker is considered as being associated with the current blob. Otherwise, if the size ratio is smaller than the minimum size ratio (or equal to in some cases), the candidate bounding box, as well as its tracker, is determined to not be associated with the current blob. The minimum size ratio can be set to any suitable threshold number or percentage (e.g., 0.5, 0.6, 0.7, 0.8, or other suitable threshold) representing a minimum amount of overlap between the blob bounding box and the bounding box of the candidate tracker.

The tracker association engine 824 can perform a similar process for the current blob using bounding boxes of the trackers 810 to determine whether more trackers and their bounding boxes are associated with the current blob. Returning to FIG. 9 as an example, the bounding box 904 and bounding box 906 can be determined to be associated with the merged blob 902 by the tracker association engine 824 (e.g., based on the size ratios between the blob 902 bounding box and the two candidate bounding boxes 904 and 906 being greater than the minimum size ratio). The tracker association engine 824 can also perform a similar process for the trackers 810 relative to each of the blobs 808 for the current frame to determine which trackers are associated with each blob.

In some cases, a current blob may not be associated with any tracker or may be associated with just one tracker by the tracker association engine 824. When the number of tracker bounding boxes associated with a current blob is equal to or smaller than one, no splitting is performed. For example, if the current blob is not associated with any tracker or is associated with just one tracker, the blob splitting process terminates for the current blob, in which case the current blob is not modified (or split). The current blob can then be included in the modified blobs 811 list the same as it was included in the input blobs 808.

When a blob is associated with multiple tracker bounding boxes by the tracker association engine 824, a recursive process can be performed to possibly split the blob into multiple blobs (e.g., into multiple blob bounding boxes). For example, one or more blob splitting conditions can be analyzed to determine whether to split a merged blob into multiple blobs (e.g., into multiple tracker bounding boxes). Blob splitting conditions can be based on a spatial relationship between bounding regions of the two or more blob trackers and a bounding region of an identified blob.

In addition to the bounding box of the blob and, in some cases, the foreground mask for the current frame, the input to the blob splitting engine 828 is two tracker bounding boxes that are associated with the blob. The process includes applying different functions based on whether the number of tracker bounding boxes associated with the current blob is larger than two or is equal to two. For example, when the number of tracker bounding boxes associated with a current blob is equal to two, the tracker bounding boxes are processed directly by the blob splitting engine 828 (bypassing the primary bounding box selection engine 826). When the number of tracker bounding boxes associated with a current blob is larger than two, one primary or optimal bounding box is selected by the primary bounding box selection engine 826. In some cases, the primary bounding box may be defined in a way that the union of the remaining bounding boxes associated with the blob has the smallest size. The remaining two or more bounding boxes associated with the current blob can then be unified or combined into a combined bounding box. The primary bounding box and the combined bounding box are then processed by the blob splitting engine 828.

FIG. 11A-FIG. 11D include diagrams illustrating an application of the blob splitting process to a current blob that is associated with more than two tracker bounding boxes. FIG. 11A shows the initial inputs for analyzing the current blob. The initial inputs include the bounding box 1102 for the current blob and the tracker bounding boxes 1104, 1106, and 1108 that are determined to be associated with the current blob bounding box 1102 by the tracker association engine 624. As shown in FIG. 11B, the tracker bounding box 1104 is determined to be the primary (or optimal) tracker bounding box. In some examples, the primary bounding box may be defined in a way that the union of the remaining associated bounding boxes has the smallest size. For example, the union of the bounding box 1106 and the bounding box 1108 (shown as combined bounding box 1110 in FIG. 11C and FIG. 11D) provide the smallest size union among the possible unions between bounding boxes 1104 and 1106, between bounding boxes 1104 and 1108, and between bounding boxes 1106 and 1108. Based on the union between the bounding boxes 1106 and 1108 providing the smallest size union among the possible unions, bounding box 1104 is selected as the primary bounding box. Any other suitable technique for selecting the primary bounding box can also be performed. For example, the tracker bounding box with the largest intersection region (e.g., similar to intersecting region 1008 in FIG. 10) with the blob bounding box 1102 can be defined or selected as the primary bounding box. In another illustrative example, the tracker bounding box having highest size ratio (ratio of the intersection of the blob bounding box and tracker bounding box over a size of the blob bounding box) can be defined or selected as the primary bounding box. According to any of these illustrative techniques, the tracker bounding box 1104 would be selected as the primary bounding box.

After the primary bounding box is chosen, the remaining bounding boxes 1106 and 1108 are unified or combined to be a new combined bounding box 1110, as shown in FIG. 11C and FIG. 11D. In some examples, the remaining bounding boxes can be combined by performing a union operation among all the remaining bounding boxes. For example, the bounding boxes 1106 and 1108 can be combined by performing a union operation between the bounding boxes 1106 and 1108, as illustrated in FIG. 11C. By unifying the remaining bounding boxes 1106 and 1108 into the combined bounding box 1110, the blob splitting functions performed by the blob splitting engine 828 can be simplified. In some implementations, rather than processing only two bounding boxes, the blob splitting engine 828 can process more than two tracker bounding boxes for a given blob.

In some cases, the blob splitting engine 628 can process one blob and two associated bounding boxes. For example, the blob splitting engine 828 can obtain as input the current blob, the two tracker bounding boxes associated with the current blob, and the foreground mask for the current frame. In some cases, as noted above, the two tracker bounding boxes can include a primary bounding box and a combined bounding box when more than two tracker bounding boxes were associated with the blob bounding box. For example, referring to FIG. 11D, one associated tracker bounding box is the primary bounding box 1104 and the other associated tracker bounding box is the unified bounding box 1110. In other cases, the two tracker bounding boxes can include the actual bounding boxes of two trackers when only two trackers were associated with the blob bounding box.

The blob splitting engine 828 determines whether or not the current blob should be split into the two associated tracker bounding boxes based on one or more splitting conditions. For simplicity, the blob to be split can be defined as a container box (denote as cBox), the two associated tracker bounding boxes (to be split to) can be denoted as bLBox and bRBox, and the number of foreground pixels within a generic bounding box bbox is denoted as area (bbox). Using FIG. 11D as an example, the blob bounding box 1102 can be denoted as the cBox, the primary bounding box 1104 can be denoted as bLBox, and the combined bounding box 1110 can be denoted as bRBox. The same denotations could be used if the bounding boxes 1104 and 1110 were both actual bounding boxes of trackers (as opposed to the bounding box 1110 being a union of two trackers bounding boxes 1106 and 1108).

In some examples, if the two associated tracker bounding boxes 1104 and 1110 (bLBox and bRBox) cover a majority of the foreground area of the blob bounding box 1102 (cBox), a split is desirable. In some examples, a split is desirable if the associated tracker bounding boxes 1104 and 1110 (bLBox and bRBox) do not cover too large of a foreground area that is outside of the blob bounding box 1102 (cBox). For example, if a foreground area (e.g., the number of foreground pixels area(bbox)) of the two associated tracker bounding boxes 1104 and 1110 (bLBox and bRBox) within the blob bounding box 1102 (cBox) dominates the foreground area of the tracker bounding boxes 1104 and 1110 (bLBox and bRBox) and if most of the foreground area of the two associated tracker bounding boxes 1104 and 1110 (bLBox and bRBox) is within the blob bounding box 1102 (cBox), the blob splitting engine 828 can split the blob bounding box 1102 (cBox) into the two associated bounding boxes 1104 and 1110. One specific illustrative example of such an implementation is as follows:

a. Determine the intersection bounding boxes: bILBox=bLBox∩cBox and bIRBox=bRBox∩cBox b. areaWithinBoxSum=area(bILBox)+area(bIRBox);
c. areaSum=area(bLBox)+area(bRBox);
d. areaContainer=area(cBox);
e. If areaWithinBoxSum is larger than areaSum*$T_1$ and areaSum is larger than areaContainer*$T_2$, the cBox is split into bLBox and bRBox; otherwise, no more splitting for all bounding boxes related to cBox. Here, $T_1$ and $T_2$ both reflect any suitable percentage ratio (e.g., $T_1$=0.8 and $T_2$=0.85, or any other suitable percentage ratios for $T_1$ and $T_2$).

Figure 12A:
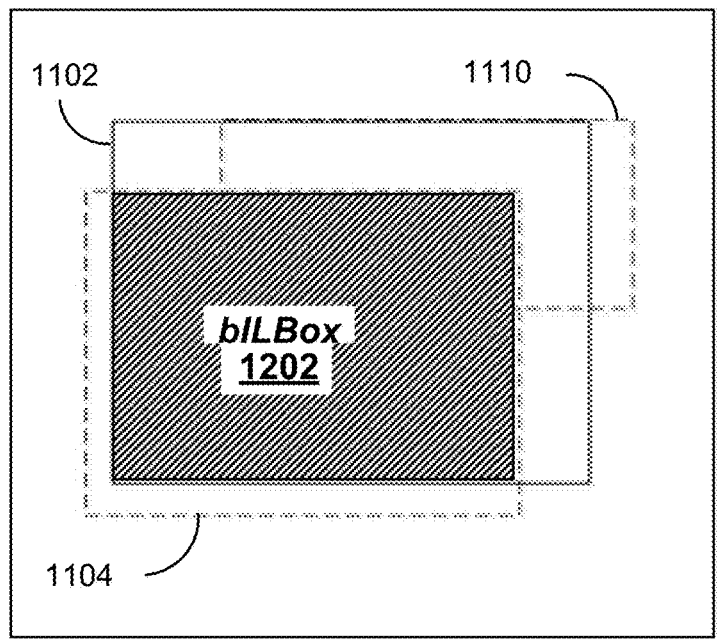
FIG. 12A-FIG. 12E are diagrams illustrating examples of different areas of tracker bounding boxes and a blob bounding box, in accordance with some examples.
Figure 12B:
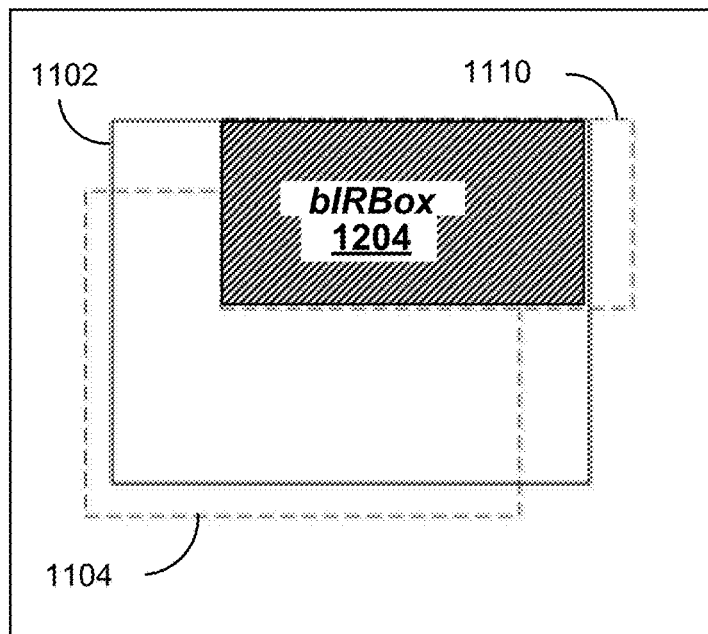
Figure 12C:
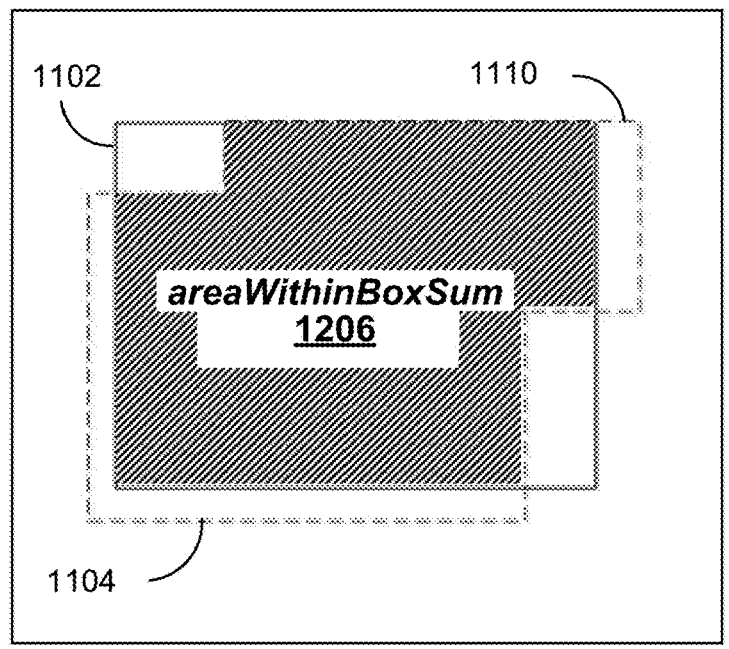
Figure 12D:
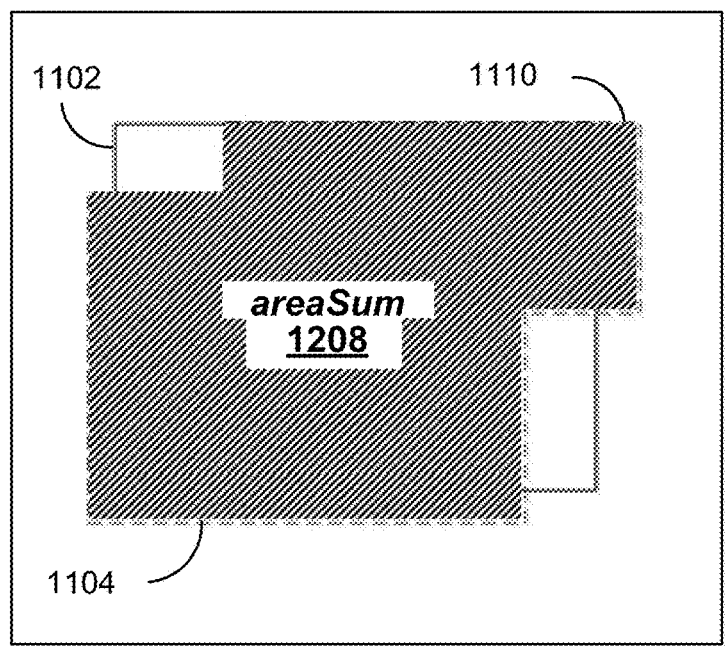
Figure 12E:
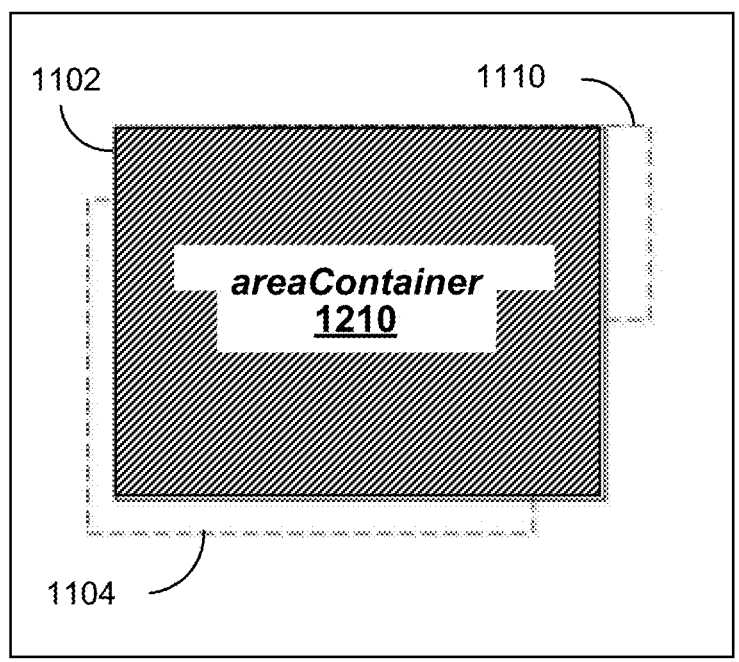

FIG. 12A shows an example of the intersection bounding box bILBox 1202, which includes the area of intersection (or intersection area) between the tracker bounding box 1104 and the blob bounding box 1102 from FIG. 11D. FIG. 12B shows an example of the intersection bounding box bIRBox 1204, which includes the area of intersection between the tracker bounding box 1110 and the blob bounding box 1102 from FIG. 11D. FIG. 12C shows an example of the areaWithinBoxSum 1206, which includes the area (e.g., number of foreground pixels) of the bILBox 102 and the bIRBox 1204 (representing the foreground pixels of the bounding boxes 1104 and 1110 that are within the blob bounding box 1102). FIG. 12D shows an example of the areaSum 1208, which includes the total area (e.g., number of foreground pixels) of the tracker bounding box 1104 (bLBox) and the tracker bounding box 1110 (bRBox). FIG. 12E shows an example of the areaContainer 1210, which includes the total area (e.g., number of foreground pixels) of the blob bounding box 1102 (cBox).

Using the notation above, the blob bounding box 1102 (cBox) can be split into the tracker bounding box 1104 (bLBox) and the combined bounding box 1110 (bRBox) if areaWithinBoxSum 1206 is larger than $T_1$*areaSum 1208 and if areaSum 1208 is larger than $T_2$*areaContainer 1210. For example, if the area of the tracker bounding boxes 1104 and 1110 that is within the blob bounding box 1102 (the areaWithinBoxSum 1206 region) is at least 80% of the total area of the tracker bounding boxes 1104 and 1110 (the areaSum 1208 region), it can be determined that the foreground area of the two associated tracker bounding boxes 1104 and 1110 that is within the blob bounding box 1102 dominates the total foreground area of the tracker bounding boxes 1104 and 1110. Further, if the total area of the tracker bounding boxes 1104 and 1110 (the areaSum 1208 region) is at least 85% of the area of the blob bounding box 1102 (the areaContainer 1210 region), it can be determined that most of the foreground area of the two associated tracker bounding boxes 1104 and 1110 is within the blob bounding box 1102. One of ordinary skill will appreciate that other suitable values of $T_1$ and $T_2$ can be used other than 0.8 and 0.85, respectively. In some cases, the split can occur only if both of the conditions are met. In some cases, the split can occur if only one of the conditions are met. If one or both of the two conditions are not met, the blob splitting engine 828 can perform no more splitting for all bounding boxes related to the blob bounding box 1102 (cBox).

In other implementations, the blob splitting engine 828 can determine whether to split a blob bounding box into two associated tracker bounding boxes by checking the intersection bounding boxes (bILBox and bIRBox) and calculating the number of foreground pixels within the intersection bounding boxes. For example, the blob splitting engine 828 can split the blob bounding box 1102 (cBox) into the two associated bounding boxes 1104 and 1110 if the areaWithinBoxSum 1206 region is greater than a threshold amount. In one illustrative example, the blob bounding box 1102 can be split if the areaWithinBoxSum 1206 region is greater than a threshold amount of the area of the blob (areaWithinBoxSum>$T_3$*areaContainer, with $T_3$ being a percentage ratio, such as 0.75, 0.8, 0.85, or other suitable percentage ratio). In other implementations, the union of the associated tracker bounding boxes may be used instead of the intersection.

Based on the recursive process performed by the blob splitting engine 828, if the blob splitting engine 828 determines that the blob should not be split, the whole blob splitting process can be terminated for the current blob and a next blob or next frame can be analyzed. Otherwise, if the blob splitting engine 828 determines that the blob should be split, the blob is split into the two associated tracker bounding boxes. For example, the blob bounding box 1102 can be split into the bounding boxes 1104 and 1110. In such an example, the modified blobs 811 will include separate blob bounding boxes 1104 and 1110 (and thus separate blobs) instead of the blob bounding box 1102.

Figure 13:
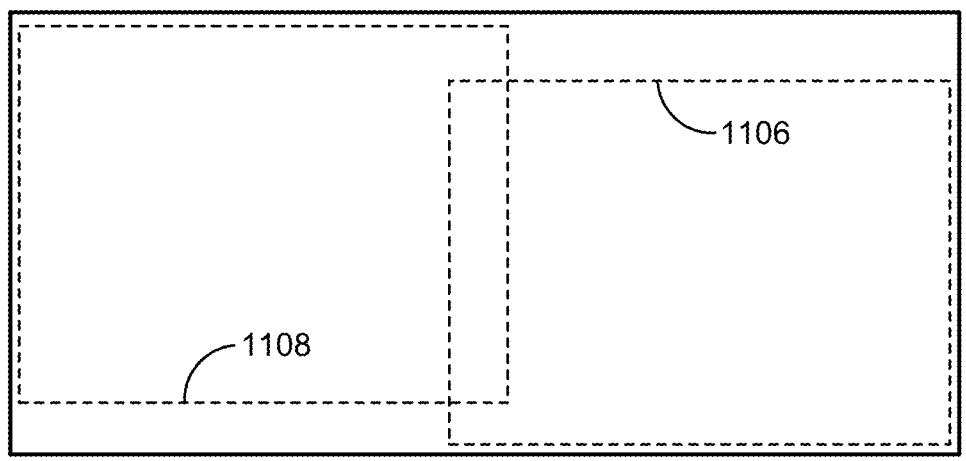
FIG. 13 is a diagram further illustrating the example application of the blob splitting process to the blob associated with multiple tracker bounding boxes, in accordance with some examples.

In cases where a primary bounding box and a combined bounding box were processed (when more than two tracker bounding boxes are associated with a blob bounding box), the blob splitting engine 828 can recursively perform the same blob splitting process on the newly split blob (e.g., the newly split blob corresponding to the combined bounding box 1110) and the remaining bounding boxes making up the combined bounding box (e.g., remaining bounding boxes 1106 and 1108 of the combined bounding box 1110). The combined bounding box 1110 is shown in FIG. 13 along with the remaining bounding boxes 1106 and 1108 making up the combined bounding box 1110. In one illustrative example, the blob splitting engine 828 can split the new blob bounding box 1110 (now denoted as cBox) into the bounding box 1108 (now bLBox) and the bounding box 1106 (now bRBox) if areaWithinBoxSum of the bounding boxes 1106 and 1108 is larger than $T_1$*areaSum of the bounding boxes 1108 and 1106, and if areaSum is larger than $T_2$*areaContainer of the new blob bounding box 1110. If either condition is not met, the blob splitting engine 828 can end the splitting process for the blob 1102. In some cases, the blob splitting process is ended only if both conditions are not met. The other blob splitting conditions provided above could also be used to determine whether to split the combined bounding box 1110 into the separate bounding boxes 1106 and 1108.

In the above recursive splitting process, if there are N original associated tracker bounding boxes associated with one blob output from the blob detection engine, up to N−1 levels of recursive simple splitting processes may apply. However, in each level, once the blob splitting engine 828 decides the blob splitting should not be done for a bounding box, the whole recursive process terminates for that blob. Therefore, the results of splitting one blob may lead to M bounding boxes, with M equal to 1 (the blob itself), 2, 3, . . . , or N bounding boxes. When M is smaller than N−1, the blob is actually split into one or more original associated bounding boxes plus a union of the remaining original associated bounding boxes.

In some implementations, a corner based split blob location (CSBL) adjustment process may be performed to compensate for the fact that the tracker bounding box locations were predicted. For example, since the geometry information of each associated tracker bounding box was predicted (e.g., by a Kalman filter or other means), the bounding box location might be inaccurate and such error may accumulate. The CSBL adjustment process can be performed for each associated tracker bounding box that has been split from a blob and that will become a blob bounding box included in the modified list of the blobs (blobs 811). For example, in order to have a more accurate location for each of the associated tracker bounding boxes, the CSBL adjustment process can be applied to correct the location of the tracker bounding box (which is also a bounding box of a newly split blob since the tracker bounding box is now the newly split blob's bounding box).

Figure 14A:
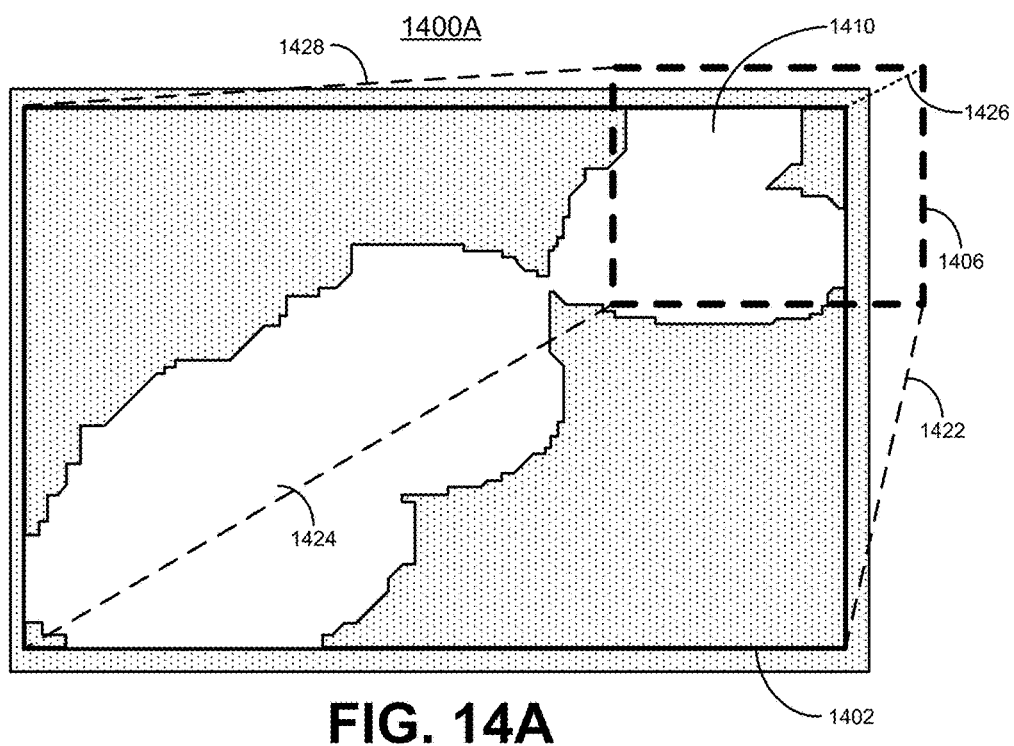
FIG. 14A-FIG. 14B is a diagram illustrating an example of an application of a split blob location adjustment process, in accordance with some examples.
Figure 14B:
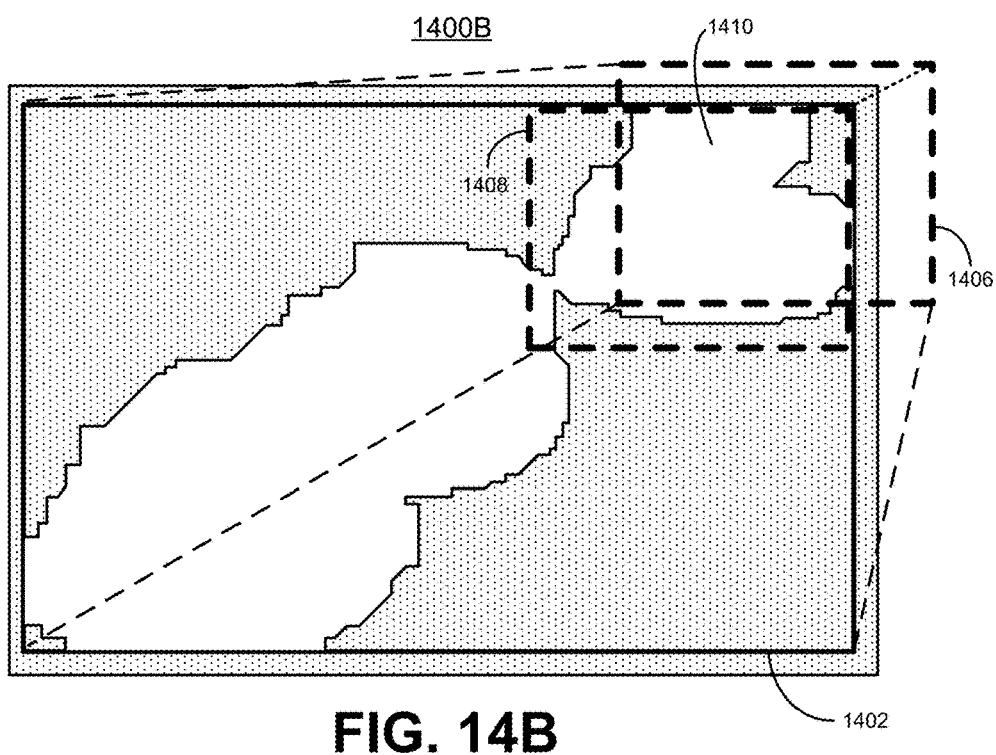

FIG. 14A-FIG. 14B are examples of cropped portions of a foreground mask 1400A and 1400B illustrating an example of an application of a the CSBL adjustment process. The blob splitting engine 828 can perform the CSBL adjustment process by calculating the distance between the four corner pairs of an associated tracker bounding box abBox (e.g., tracker bounding box 1406 in FIGS. 14A-14B) and its container cBox (e.g., blob bounding box 1402 in FIG. 14A-14B). The four corner pairs can include the bottom-right corners, the bottom-left corners, the top-right corners, and the top-left corners of the two bounding boxes abBox and cBox. For example, referring to FIG. 14A, the blob splitting engine 828 can determine the distance 1422 between the bottom-right corner of bounding box 1406 and the bottom-right corner of bounding box 1402, the distance 1424 between the bottom-left corner of bounding box 1406 and bottom-left corner of bounding box 1402, the distance 1426 between the top-right corner of bounding box 1406 and the top-right corner bounding box 1402, and the distance 1428 between the top-left corner of bounding box 1406 and the top-left corner of bounding box 1402.

The container box (cBox) is the output of the blob detection engine and thus has a more reliable geometry location in the foreground mask. The blob splitting engine 828 can determine if shifting one of the corners of the associated bounding box (abBox) to align with one of the corners of the container box (cBox) will put the associated bounding box (abBox) in a better location relative to the newly split blob. For example, the blob splitting engine 828 can determine the closest corner pair between the container box (cBox) and the associated bounding box (abBox), and can analyze the associated bounding box (abBox) if it was shifted to the location of the closest corner. Referring to FIG. 14A, the closest corner pair between the bounding box 1406 and the blob bounding box 1402 is the top-right corner pair (with distance 1426). If the closest corner of the container box (cBox) is set to be the corner of the associated bounding box (abBox) (requiring the associated bounding box to be shifted), and the shifted location of the associated bounding box (abBox) is considered to be better than before, the associated bounding box (abBox) is finally shifted. Otherwise, the associated bounding box (abBox) is not shifted.

The four corner locations of a bounding box bbox can be denoted as Corner (bbox). The first area of corners is defined as PC=Corner (cBox) and the second area of corners is defined as PA=Corner (abBox). The distance is determined as $Dist[i]=\|PC[i]-PA[i]\|$, wherein the $\|\cdot\|$ may indicate L2-norm. The term i is equal to 1 through 4, corresponding to top-left, top-right, bottom-left, and bottom-right corners, respectively. The corner i that is selected is the one that minimizes $Dist[i]$. As shown in FIG. 14A, the top-right corner pair has the minimum distance 1426. When i is chosen and the corner location is known, the associated bounding box is shifted by a vector of $PC[i]-PA[i]$ to be a shifted bounding box. For example, FIG. 14B shows a shifted bounding box 1408, which is the bounding box 1406 with its top-right corner shifted to the location of the top-right corner of the bounding box 1402.

The blob splitting engine 828 can determine if the shifted bounding box is in a better location relative to the newly split blob 1410 than the associated bounding box based on the number of foreground pixels of the newly split blob 1410 in the shifted and associated bounding boxes. Referring to FIG. 14B, the number of foreground pixels within the shifted bounding box 1408 and the number of foreground pixels within the associated bounding box 1406 is compared to determine if the bounding box should be moved to the shifted bounding box 1408 location or be left in the associated bounding box 1406 location. For example, if the shifted bounding box 1408 contains more foreground pixels of the blob 1410 than the associated bounding box 1406, the associated bounding box 1406 is finally adjusted to be the shifted bounding box 1408 using the CSBL adjustment process. Otherwise, if the shifted bounding box 1408 does not contain more foreground pixels of the blob 1410 than the associated bounding box 1406, the associated bounding box 1406 is not adjusted during CSBL. In the example of FIG. 14B, where the shifted bounding box 1408 is aligned with the container bounding box 1402 at the top-right corner, since the shifted bounding box 1408 contains more foreground pixels of the blob 1410 than the associated bounding box 1406, the final bounding box after the CSBL process will be modified to be the shifted bounding box 1408.

In some implementations, a minimum corner to corner length can be used as a threshold for shifting a bounding box position. For example, the smallest distance between corner pairs between a container bounding box and an associated tracker bounding box should be less than a minimum length for an associated tracker bounding box to be tested under the CSBL process for determining whether to shift the bounding box position. In some examples, the minimum distance can be the diagonal distance of the current associated bounding box (e.g., the diagonal distance of the bounding box 1406 in FIGS. 14A and 14B). In some examples, the minimum distance can be the length between the center of the previous bounding box location and the center of the prediction bounding box location (e.g., the prediction done by a Kalman filter). Note that the current associated blob is completely aligned with the prediction bounding box location. In some implementations, once a corner of the container bounding box (e.g., bounding box 1402) has been matched during CSBL, the corner may not be available anymore for other associated bounding boxes to match.

In some implementations, some video analytics features may be disabled or modified when the blob splitting process is enabled or applied. For example, in some cases, since the blob splitting process may rely largely on the shape of a blob (outputted from the blob detection engine), any methods that may significantly change the blob shape can be disabled or applied after the blob splitting system. In one illustrative example, the density based blob area trimming process can be disabled in some cases. In another illustrative example, the density based blob area trimming process can be applied on the list of modified blobs (on modified blobs 811).

FIG. 15 illustrates an example of a process 1500 of splitting one or more merged blobs for one or more video frames using the blob splitting techniques described herein. At step 1502, the process 1500 includes identifying a blob detected for a current video frame. The identified blob includes pixels of at least a portion of a foreground object in the current video frame. In one illustrative example, the identified blob can be included in the blobs 808 detected for the current frame by a blob detection engine.

At step 1504, the process 1500 includes determining the identified blob is associated with two or more blob trackers from a plurality of blob trackers. The plurality of blob trackers are received from an object tracking operation performed for a previous video frame. For example, the blob trackers can be received as feedback from the object tracking engine, as described above. In one illustrative example, the plurality of blob trackers can include the blob trackers 810. In some cases, locations of the plurality of blob trackers in the current video frame are based on locations of blobs tracked by the plurality of blob trackers for the previous video frame. For example, the plurality of blob trackers can include predicted bounding regions of the blob trackers (and the tracker IDs) predicted from a previous frame. The previous frame is obtained before the current frame (e.g., a frame immediately prior to the current frame or a frame earlier in the video sequence). A bounding region can include a bounding box, a bounding circle, a bounding ellipse, or any other suitably-shaped region representing a tracker or a blob.

At step 1506, the process 1500 includes determining one or more splitting conditions are met. In some cases, the one or more splitting conditions are based on a spatial relationship between bounding regions of the two or more blob trackers and a bounding region of the identified blob. One example of a splitting condition can include tracker bounding boxes (or other bounding regions) associated with the identified blob covering a majority of the foreground area of a bounding box (or other bounding region) of the identified blob. Another example of a splitting condition can include tracker bounding boxes (or other bounding regions) associated with the identified blob not covering too large of a foreground area that is outside of the bounding box (or other bounding region) of the identified blob. Details of splitting conditions are described below.

At step 1508, the process 1500 includes, in response to determining the one or more splitting conditions are met, splitting the identified blob into a first blob and a second blob. At step 1510, the process 1500 includes outputting the first blob and the second blob for object tracking for the current frame. In some cases, the identified blob is not output for object tracking for the current frame. For example, the process 1500 can include obtaining a list of blobs detected for the current frame (the list of blobs include the identified blob), and modifying the list of blobs by including the first blob and the second blob in the list and by removing the identified blob from the list. The process 1500 can further include outputting the modified list of blobs for the object tracking for the current frame. In one illustrative example, the output first blob and second blob can be included in the modified blobs 811 that are provided to a tracking engine or system. In some cases, the first blob is associated with a first bounding region of a first blob tracker of the two or more blob trackers, and the second blob is associated with a second bounding region of a second blob tracker of the two or more blob trackers. For instance, the first blob can be output as the first bounding region and the second blob can be output as the second bounding region. In some examples, a list of modified blobs that are provided to the object tracking engine for performing object tracking for the current frame can include a list of blob bounding regions (e.g., blob bounding boxes), in which case the first blob is represented in the modified list of blobs as the first bounding region and the second blob is represented in the modified list of blobs as the second bounding region. The data association engine (e.g., data association engine 414) of the object tracking engine can then use the blob bounding regions in the modified list of blobs to associate tracker bounding regions with for object tracking. By replacing the identified blob, the first blob and the second blob are used to track the separate objects, while the identified blob is no longer itself tracked as a whole.

In some implementations, the process 1500 can determine whether the identified blob is associated with two blob trackers, or is associated with more than two blob trackers. In some examples, when the identified blob is associated with two blob trackers, determining the one or more splitting conditions are met includes determining a first bounding region of a first blob tracker associated with the identified blob and a second bounding region of a second blob tracker associated with the identified blob encompass at least a threshold amount of foreground pixels of the identified blob. The identified blob can then be split into the first blob and the second blob when the first bounding region of the first blob tracker and the second bounding region of the second blob tracker encompass at least the threshold amount of foreground pixels of the identified blob. In some examples, when the identified blob is associated with two blob trackers, determining the one or more splitting conditions are met further includes determining at least a threshold amount of foreground pixels encompassed by the first bounding region of the first blob tracker and the second bounding region of the second blob tracker include foreground pixels of the identified blob. In such examples, the identified blob is split into the first blob and the second blob when the first bounding region of the first blob tracker and the second bounding region of the second blob tracker encompass at least the threshold amount of foreground pixels of the identified blob and when at least the threshold amount of foreground pixels encompassed by the first bounding region of the first blob tracker and the second bounding region of the second blob tracker include foreground pixels of the identified blob.

In some examples, when the identified blob is associated with two blob trackers, the process 1500 includes determining the one or more splitting conditions are met by determining a first intersection region between the identified blob and a first bounding region of a first blob tracker associated with the identified blob, and determining a second intersection region between the identified blob and a second bounding region of a second blob tracker associated with the identified blob. An example of an intersection region 1008 is shown in FIG. 10 and is described above. In such examples, determining the one or more splitting conditions are met further includes determining an area of the identified blob. In some cases, the area of the identified blob can include a number of foreground pixels of the identified blob. Determining the one or more splitting conditions are met further includes determining an intersection area of the first intersection region and the second intersection region. In some cases, the intersection area can include a number of foreground pixels of the identified blob within the first intersection region and the second intersection region. Determining the one or more splitting conditions are met further includes determining a total area of the first bounding region and the second bounding region. In some cases, the total area can include a total number of foreground pixels within the first bounding region and the second bounding region. In such examples, the one or more splitting conditions are determined to have been met and the identified blob is split into the first blob and the second blob when the intersection area is greater than a threshold amount of the total area and when the total area is greater than a threshold amount of the area of the identified blob.

In some examples, when the identified blob is associated with two blob trackers, the process 1500 includes determining the one or more splitting conditions are met by determining a first intersection region between the identified blob and a first bounding region of a first blob tracker associated with the identified blob, and determining a second intersection region between the identified blob and a second bounding region of a second blob tracker associated with the identified blob. An example of an intersection region 1008 is shown in FIG. 10 and is described above. In such examples, determining the one or more splitting conditions are met further includes determining an area of the identified blob. In some cases, the area of the identified blob includes a number of foreground pixels of the identified blob. Determining the one or more splitting conditions are met further includes determining an intersection area of the first intersection region and the second intersection region. In some cases, the intersection area includes a number of foreground pixels of the identified blob within the first intersection region and the second intersection region. In such examples, the one or more splitting conditions are determined to have been met and the identified blob is split into the first blob and the second blob when the intersection area is greater than a threshold amount of the area of the identified blob.

In some examples, when the identified blob is associated with more than two blob trackers, the process 1500 can further include selecting a first bounding region of a first blob tracker associated with the identified blob as a primary bounding region. For example, the primary bounding region can be selected such that a union of remaining bounding regions associated with the identified blob have a smallest size. Using FIG. 11A-FIG. 11D as an illustrative example, the union of the bounding box 1106 and the bounding box 1108 (shown as combined bounding box 1110 in FIG. 11C and FIG. 11D) provide the smallest size union among the possible unions between bounding boxes 1104 and 1106, between bounding boxes 1104 and 1108, and between bounding boxes 1106 and 1108. The process 1500 can further include combining a second bounding region of a second blob tracker and a third bounding region of a third blob tracker into a combined bounding region. The second blob tracker and the third blob tracker are associated with the identified blob. An illustrative example of the second bounding region and the third bounding region include the bounding boxes 1106 and 1108 of FIG. 11C, and an illustrative example of the combined bounding box is the bounding box 1110. In some cases, the second bounding region and the third bounding region can be combined by performing a union operation on the second bounding region and the third bounding region.

In some examples, when the identified blob is associated with more than two blob trackers, determining the one or more splitting conditions are met includes determining the first bounding region of the first blob tracker and the combined bounding region encompass at least a threshold amount of foreground pixels of the identified blob. In such examples, the identified blob is split into the first blob and the second blob when the first bounding region of the first blob tracker and the combined bounding region encompass at least the threshold amount of foreground pixels of the identified blob. In some implementations, determining the one or more splitting conditions are met can further include determining at least a threshold amount of foreground pixels encompassed by the first bounding box of the first blob tracker and the combined bounding region include foreground pixels of the identified blob. In such implementations, the identified blob is split into the first blob and the second blob when the first bounding region of the first blob tracker and the combined bounding region encompass at least the threshold amount of the foreground pixels of the identified blob and when at least the threshold amount of foreground pixels encompassed by the first bounding region of the first blob tracker and the combined bounding region include foreground pixels of the identified blob.

In some implementations, the process 1500 includes splitting the combined blob into a third blob and a fourth blob. For example, the splitting process can be applied to determine whether the blob associated with the combined bounding region (e.g., the second blob) should be further split into the third blob and the fourth blob. Using FIG. 11C as an illustrative example, the third blob can be represented by the tracker bounding box 1106, and the fourth blob can be represented by the tracker bounding box 1108.

In some examples, the process 1500 can perform a corner based split blob location (CSBL) adjustment process. For example, the process 1500 can include determining distances between corners of a bounding region of a first blob tracker and corresponding corners of a bounding region of the identified blob. The process 1500 can further include determining a corner of the bounding region of the identified blob with a closest distance to a corresponding corner of the bounding region of the first blob tracker. The process 1500 can further include shifting the bounding region of the first blob tracker to a new location such that a location of the corresponding corner of the bounding region of the first blob tracker is shifted to a location of the corner of the bounding region of the identified blob. An illustrative example application of such a process is shown in FIG. 14A-FIG. 14B.

In some implementations, the process 1500 can include comparing a number of foreground pixels in the shifted bounding region of the first blob tracker to a number of foreground pixels in the bounding region of the first blob tracker before shifting. The process 1500 can include maintaining the shifted bounding region of the first blob tracker in the new location when the number of foreground pixels in the shifted bounding region is greater than the number of foreground pixels in the bounding region of the first blob tracker before shifting.

In some examples, the process 1500 can include associating the two or more blob trackers with the identified blob. For example, associating can include determining an intersection region between a candidate bounding region of a first blob tracker and a bounding region of the identified blob, and determining a size ratio. The size ratio can include a size of the intersection region over a size of the bounding region of the first blob. Associating can further include determining the size ratio is greater than a minimum size ratio, and determining the first blob tracker is associated with the identified blob when the size ratio is greater than the minimum size ratio. Associating the two or more blob trackers with the identified blob can be performed by the tracker association engine 824.

In some examples, the process 1500 may be performed by a computing device or an apparatus, such as the video analytics system 100. For example, the process 1500 can be performed by the video analytics system 100 shown in FIG. 1 and/or the blob splitting system 820 shown in FIG. 8. In some cases, the computing device or apparatus may include a processor, microprocessor, microcomputer, or other component of a device that is configured to carry out the steps of process 1500. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1500 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Using the blob splitting methods and systems describe above to split certain blobs for a current frame before tracking is performed on the current frame resolves the merging issue with minimal complexity. For example, objects being merged together too frequently not only causes a diminished user experience, but also leads to other system level problems. One system level problem caused by frequent merging includes breaking the trajectory of multiple objects. Another problem is that frequent merging can ruin the state machine of one or more trackers. For example, a big object may not be tracked after it is split from a merged object, such as when two people that were detected as a merged blob walk away from one another and are subsequently detected as separate blobs. Another system level problem caused by frequent merging is that it provides many ambiguous bounding boxes for more intelligent modules to analyze only the texture within a bounding box, such as person re-identification, object classification, or the like. This can cause both lower accuracy (since the texture is ruined) and higher complexity for those more intelligent modules (since more rejections would be expected, and thus more invocations of those modules are needed). Such problems can be avoided using the blob splitting methods and systems described herein.

The proposed techniques can be evaluated in an end-to-end IP camera (IPC) system, wherein the frame level accuracy as well as the object level accuracy are measured by comparing with ground truth. In addition to the overall accuracy, the proposed system and methods are also able to evaluate the number of merges that happened wherein objects within the merged bounding boxes are actually identified as containing individual bounding boxes in ground truth.

As shown in Table 1 below, the proposed techniques maintain a similar tracking accuracy, true positive rate, and false positive rate as compared to the anchor method over 40 VIRAT test sequences and 6 IPCVA test sequences. However, the number of times a wrong merge happens decreased significantly for both test sets, by percentages of 17% and 16% respectively. Such an observation is more obvious for the sequences that have relatively more merges (some test sequences do not have any merges). For the sequences with merges happening in a relatively long duration (e.g., VIRAT_S_000201_02_000590_000623), the reduction of wrong merges reaches 25%.

TABLE 1

Objective Results Using Proposed Blob Splitting Techniques Versus Anchor

| Method | Sequence (set) | Wrong merge counter | Tracking accuracy | True posit. rate | False posit. rate |
|---|---|---|---|---|---|
| Anchor | Average IPCVA | 294 | 0.55 | 0.89 | 0.10 |
| Proposed | Average IPCVA | 243 | 0.55 | 0.89 | 0.10 |
| Anchor | Average VIRAT | 329 | 0.64 | 0.87 | 0.08 |
| Proposed | Average VIRAT | 276 | 0.65 | 0.86 | 0.08 |
| Anchor | VIRAT_S_000201_02_000590_000623 | 449 | 0.63 | 0.78 | 0.00 |
| Proposed | VIRAT_S_000201_02_000590_000623 | 336 | 0.65 | 0.78 | 0.00 |
| Anchor | ipcva_20150908142345 | 602 | 0.80 | 0.86 | 0.24 |
| Proposed | ipcva_20150908142345 | 496 | 0.81 | 0.86 | 0.23 |

Examples are shown in FIG. 16A-FIG. 19 comparing video sequences for which the blob splitting process is applied to video sequences for which the blob splitting process is not applied. As can be seen in the various examples, the blob splitting process described herein allows objects to be individually tracked, even when objects are close together in a scene and are merged together during the blob detection.

Figure 16B:
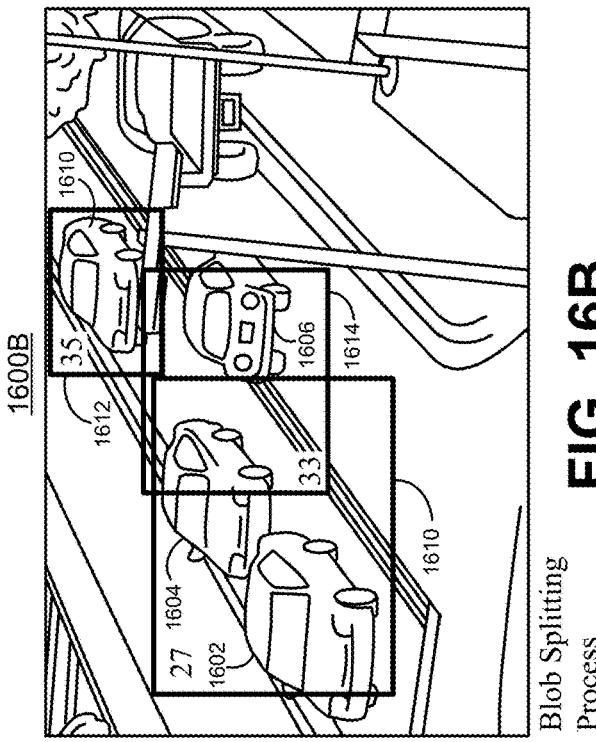
FIG. 16A-FIG. 16B is an illustration of video frames of an environment in which objects are detected, in accordance with some examples.
Figure 16A:
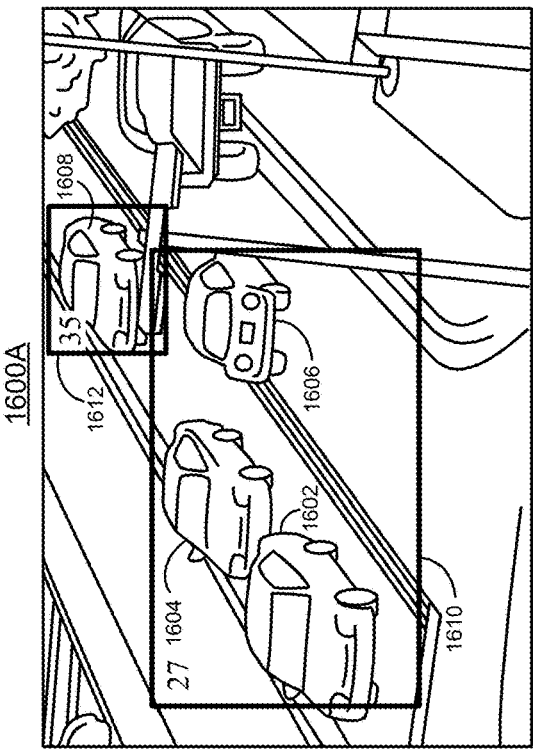

FIG. 16A and FIG. 16B are examples of video frames 1600A and 1600B of an environment in which objects are detected and tracked, illustrating that the proposed blob splitting techniques can split merged objects even in complicated scenarios. The blob splitting process is applied to frame 1600B, but is not applied to frame 1600A. As shown in FIG. 16A, three cars 1602, 1604, and 1606 are merged together during blob detection and are tracked by a single blob tracker bounding box 1610 with a tracker ID equal to 27. The car 1608 is tracked by the tracker bounding box 1612 with a tracker ID equal to 35. As shown in FIG. 16B, when the blob splitting process is performed, the tracker bounding box 1614 with tracker ID equal to 33 is split from the tracker bounding box 1610 such that the car 1606 is tracked using the tracker bounding box 1614, and the cars 1602 and 1604 are tracked using the tracker bounding box 1610. The car 1610 is also tracked by the tracker bounding box 1612. As illustrated by FIG. 16B, even in complicated scenarios, the proposed blob splitting techniques can split merged objects resulting from blob detection.

Figure 17B:
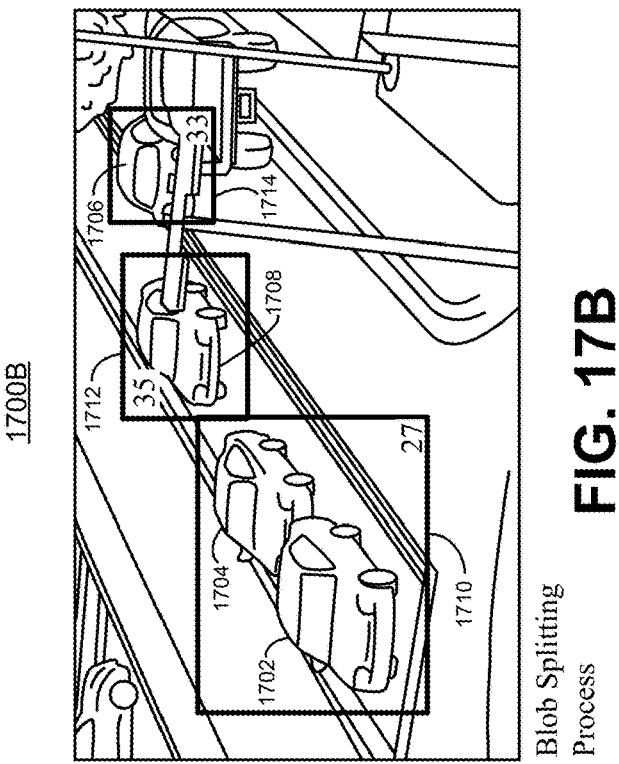
FIG. 17A-FIG. 17B is an illustration of video frames of an environment in which objects are detected, in accordance with some examples.
Figure 17A:
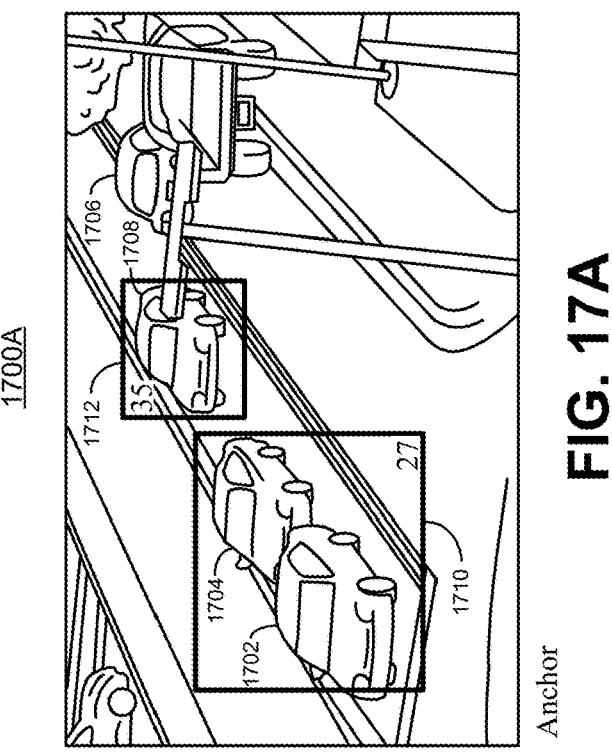

FIG. 17A and FIG. 17B include another example of video frames 1700A and 1700B of an environment in which objects are detected and tracked, illustrating that the proposed blob splitting techniques can help maintain tracking consistency. The blob splitting process is applied to frame 1700B, but is not applied to frame 1700A. As shown in FIG. 17A, the two cars 1702 and 1704 are tracked by a single blob tracker bounding box 1710 with a tracker ID equal to 27. The car 1708 is tracked by the tracker bounding box 1712 with a tracker ID equal to 35. However, the car 1706 is not tracked by any tracker. As shown in FIG. 17B, when the blob splitting process is performed, the car 1706 is tracked using the tracker bounding box 1714 with tracker ID equal to 33. As can be seen, the blob splitting process helps to maintain tracking consistency.

FIG. 18A and FIG. 18B include another example of video frames 1800A and 1800B of an environment in which objects are detected and tracked, illustrating that the proposed blob splitting techniques can split merged objects even when there are largely overlapping objects within a bounding box. The blob splitting process is applied to frame 1800B, and is not applied to frame 1800A. As illustrated in FIG. 18A, two people 1802 and 1804 are largely overlapping in the scene, and thus are merged together during blob detection. Due to the merging, both people 1802 and 1804 are tracked by a single blob tracker bounding box 1806 with a tracker ID equal to 395. As shown in FIG. 18B, when the blob splitting process is performed, the tracker bounding box 1808 with tracker ID equal to 337 is split from the tracker bounding box 1806 such that the person 1804 is tracked using the tracker bounding box 1808 and the person 1802 is tracked using the tracker bounding box 1806. As can be seen in FIG. 18B, the proposed blob splitting techniques can split merged objects resulting from blob detection, even when there is a large overlap between objects within a bounding box.

Figure 19:
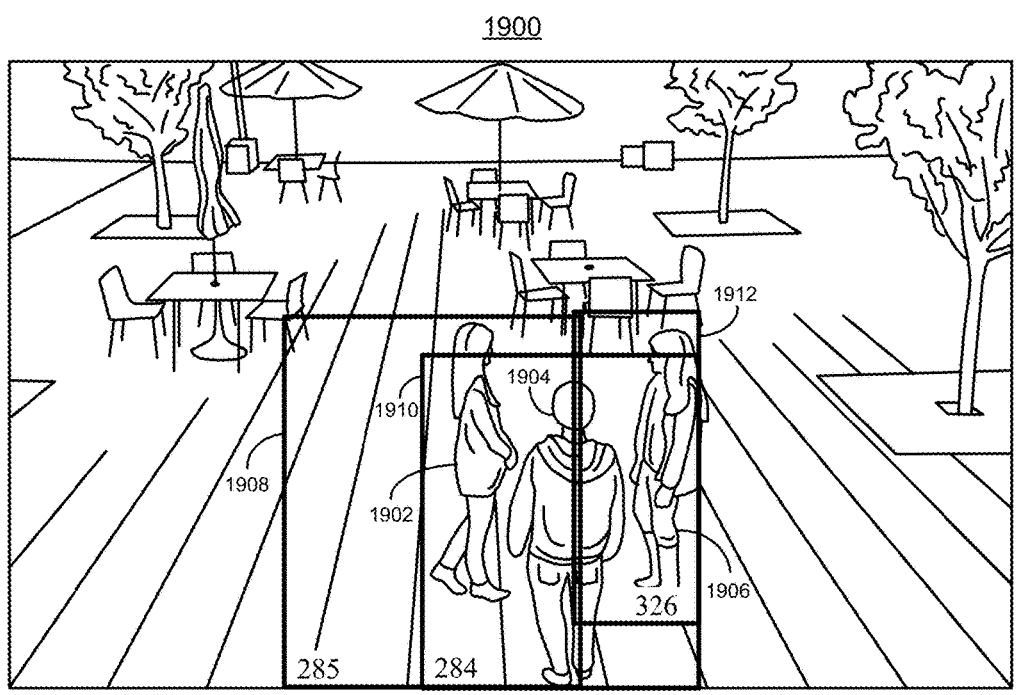
FIG. 19 is an illustration of video frames of an environment in which objects are detected, in accordance with some examples.

FIG. 19 includes another example of a video frame 1900A of an environment in which objects are detected and tracked, illustrating that the proposed blob splitting techniques can work for cases when three or more moving objects are merged together. The blob splitting process is applied to frame 1900. The three people 1902, 1904, and 1906 are close to one another in the scene, and thus are merged together during blob detection. However, the blob splitting process applies to split a single blob bounding box into the three tracker bounding boxes 1908, 1910, and 1912. For example, the person 1902 is tracked using the tracker bounding box 1908 with tracker ID equal to 285, the person 1904 is tracked using the tracker bounding box 1910 with tracker ID equal to 284, and the person 1906 is tracked using the tracker bounding box 1912 with tracker ID equal to 326. As can be seen in FIG. 19, the proposed blob splitting techniques generate quality results even when three or more moving objects are merged together during blob detection.

The blob detection and tracking operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of splitting one or more merged blobs for one or more video frames, the method comprising:
   identifying a blob detected for a current video frame, wherein the identified blob includes pixels of at least a portion of a foreground object in the current video frame;
   determining the identified blob is associated with two or more blob trackers from a plurality of blob trackers, wherein the plurality of blob trackers are received from an object tracking operation performed for a previous video frame;
   determining one or more splitting conditions are met, wherein the one or more splitting conditions are based on an amount of overlap between bounding regions of the two or more blob trackers and a bounding region of the identified blob;
   in response to determining the one or more splitting conditions are met, splitting the identified blob into a first blob and a second blob;
   outputting the first blob and the second blob for object tracking for the current video frame; and
   performing object tracking for the current video frame using the first blob and the second blob.

2. The method of claim 1, wherein locations of the plurality of blob trackers in the current video frame are based on locations of blobs tracked by the plurality of blob trackers for the previous video frame.

3. The method of claim 1, wherein the first blob is associated with a first bounding region of a first blob tracker of the two or more blob trackers, and wherein the second blob is associated with a second bounding region of a second blob tracker of the two or more blob trackers.

4. The method of claim 1, wherein the identified blob is not output for object tracking for the current video frame.

5. The method of claim 1, further comprising:
   obtaining a list of blobs detected for the current video frame, the list of blobs including the identified blob;
   modifying the list of blobs by including the first blob and the second blob and by removing the identified blob; and
   outputting the modified list of blobs for the object tracking for the current video frame.

6. The method of claim 1, wherein, when the identified blob is associated with two blob trackers, determining the one or more splitting conditions are met includes:
   determining a first bounding region of a first blob tracker associated with the identified blob and a second bounding region of a second blob tracker associated with the identified blob encompass at least a threshold amount of foreground pixels of the identified blob; and
   wherein the identified blob is split into the first blob and the second blob when the first bounding region of the first blob tracker and the second bounding region of the second blob tracker encompass at least the threshold amount of foreground pixels of the identified blob.

7. The method of claim 6, wherein determining the one or more splitting conditions are met further includes:
   determining at least a threshold amount of foreground pixels encompassed by the first bounding region of the first blob tracker and the second bounding region of the second blob tracker include foreground pixels of the identified blob; and
   wherein the identified blob is split into the first blob and the second blob when the first bounding region of the first blob tracker and the second bounding region of the second blob tracker encompass at least the threshold amount of foreground pixels of the identified blob and when at least the threshold amount of foreground pixels encompassed by the first bounding region of the first blob tracker and the second bounding region of the second blob tracker include foreground pixels of the identified blob.

8. The method of claim 1, wherein, when the identified blob is associated with two blob trackers, determining the one or more splitting conditions are met includes:
   determining a first intersection region between the identified blob and a first bounding region of a first blob tracker associated with the identified blob;
   determining a second intersection region between the identified blob and a second bounding region of a second blob tracker associated with the identified blob;
   determining an area of the identified blob;
   determining an intersection area of the first intersection region and the second intersection region;
   determining a total area of the first bounding region and the second bounding region; and
   wherein the identified blob is split into the first blob and the second blob when the intersection area is greater than a threshold amount of the total area and when the total area is greater than a threshold amount of the area of the identified blob.

9. The method of claim 8, wherein the area of the identified blob includes a number of foreground pixels of the identified blob, wherein the intersection area includes a number of foreground pixels of the identified blob within the first intersection region and the second intersection region, and wherein the total area includes a total number of foreground pixels within the first bounding region and the second bounding region.

10. The method of claim 1, wherein, when the identified blob is associated with two blob trackers, determining the one or more splitting conditions are met includes:
    determining a first intersection region between the identified blob and a first bounding region of a first blob tracker associated with the identified blob;
    determining a second intersection region between the identified blob and a second bounding region of a second blob tracker associated with the identified blob;
    determining an area of the identified blob;

determining an intersection area of the first intersection region and the second intersection region; and wherein the identified blob is split into the first blob and the second blob when the intersection area is greater than a threshold amount of the area of the identified blob.

11. The method of claim 10, wherein the area of the identified blob includes a number of foreground pixels of the identified blob and wherein the intersection area includes a number of foreground pixels of the identified blob within the first intersection region and the second intersection region.

12. The method of claim 1, further comprising when the identified blob is associated with more than two blob trackers:

selecting a first bounding region of a first blob tracker associated with the identified blob as a primary bounding region, the primary bounding region being selected such that a union of remaining bounding regions associated with the identified blob have a smallest size; and combining a second bounding region of a second blob tracker and a third bounding region of a third blob tracker into a combined bounding region, wherein the second blob tracker and the third blob tracker are associated with the identified blob.

13. The method of claim 12, wherein the second bounding region and the third bounding region are combined by performing a union operation on the second bounding region and the third bounding region.

14. The method of claim 12, wherein determining the one or more splitting conditions are met includes:

determining the first bounding region of the first blob tracker and the combined bounding region encompass at least a threshold amount of foreground pixels of the identified blob; and wherein the identified blob is split into the first blob and the second blob when the first bounding region of the first blob tracker and the combined bounding region encompass at least the threshold amount of foreground pixels of the identified blob.

15. The method of claim 14, wherein determining the one or more splitting conditions are met further includes:

determining at least a threshold amount of foreground pixels encompassed by the first bounding region of the first blob tracker and the combined bounding region include foreground pixels of the identified blob; and wherein the identified blob is split into the first blob and the second blob when the first bounding region of the first blob tracker and the combined bounding region encompass at least the threshold amount of the foreground pixels of the identified blob and when at least the threshold amount of foreground pixels encompassed by the first bounding region of the first blob tracker and the combined bounding region include foreground pixels of the identified blob.

16. The method of claim 12, further comprising splitting the combined bounding region into a third blob and a fourth blob.

17. The method of claim 1, further comprising:

determining distances between corners of a bounding region of a first blob tracker and corresponding corners of a bounding region of the identified blob;

determining a corner of the bounding region of the identified blob with a closest distance to a corresponding corner of the bounding region of the first blob tracker; and shifting the bounding region of the first blob tracker to a new location such that a location of the corresponding corner of the bounding region of the first blob tracker is shifted to a location of the corner of the bounding region of the identified blob.

18. The method of claim 17, further comprising:

comparing a number of foreground pixels in the shifted bounding region of the first blob tracker to a number of foreground pixels in the bounding region of the first blob tracker before shifting; and maintaining the shifted bounding region of the first blob tracker in the new location when the number of foreground pixels in the shifted bounding region is greater than the number of foreground pixels in the bounding region of the first blob tracker before shifting.

19. The method of claim 1, further comprising associating the two or more blob trackers with the identified blob, wherein associating includes:

determining an intersection region between a candidate bounding region of a first blob tracker and a bounding region of the identified blob;

determining a size ratio, the size ratio including a size of the intersection region over a size of the bounding region of the first blob;

determining the size ratio is greater than a minimum size ratio; and determining the first blob tracker is associated with the identified blob when the size ratio is greater than the minimum size ratio.

20. An apparatus for splitting one or more merged blobs for one or more video frames, comprising:

a memory configured to store video data associated with the one or more video frames; and a processor configured to:

identify a blob detected for a current video frame, wherein the identified blob includes pixels of at least a portion of a foreground object in the current video frame;

determine the identified blob is associated with two or more blob trackers from a plurality of blob trackers, wherein the plurality of blob trackers are received from an object tracking operation performed for a previous video frame;

determine one or more splitting conditions are met, wherein the one or more splitting conditions are based on an amount of overlap between bounding regions of the two or more blob trackers and a bounding region of the identified blob;

in response to determining the one or more splitting conditions are met, split the identified blob into a first blob and a second blob;

output the first blob and the second blob for object tracking for the current video frame; and perform object tracking for the current video frame using the first blob and the second blob.

21. The method of claim 20, wherein locations of the plurality of blob trackers in the current video frame are based on locations of blobs tracked by the plurality of blob trackers for the previous video frame.

22. The apparatus of claim 20, wherein, when the identified blob is associated with two blob trackers, determining the one or more splitting conditions are met includes:

determining a first bounding region of a first blob tracker associated with the identified blob and a second bounding region of a second blob tracker associated with the identified blob encompass at least a threshold amount of foreground pixels of the identified blob; and wherein the identified blob is split into the first blob and the second blob when the first bounding region of the first blob tracker and the second bounding region of the second blob tracker encompass at least the threshold amount of foreground pixels of the identified blob.

23. The apparatus of claim 22, wherein determining the one or more splitting conditions are met further includes:
determining at least a threshold amount of foreground pixels encompassed by the first bounding region of the first blob tracker and the second bounding region of the second blob tracker include foreground pixels of the identified blob; and
wherein the identified blob is split into the first blob and the second blob when the first bounding region of the first blob tracker and the second bounding region of the second blob tracker encompass at least the threshold amount of foreground pixels of the identified blob and when at least the threshold amount of foreground pixels encompassed by the first bounding region of the first blob tracker and the second bounding region of the second blob tracker include foreground pixels of the identified blob.

24. The apparatus of claim 20, wherein, when the identified blob is associated with two blob trackers, determining the one or more splitting conditions are met includes:
determining a first intersection region between the identified blob and a first bounding region of a first blob tracker associated with the identified blob;
determining a second intersection region between the identified blob and a second bounding region of a second blob tracker associated with the identified blob;
determining an area of the identified blob;
determining an intersection area of the first intersection region and the second intersection region;
determining a total area of the first bounding region and the second bounding region; and
wherein the identified blob is split into the first blob and the second blob when the intersection area is greater than a threshold amount of the total area and when the total area is greater than a threshold amount of the area of the identified blob.

25. The apparatus of claim 20, wherein, when the identified blob is associated with two blob trackers, determining the one or more splitting conditions are met includes:
determining a first intersection region between the identified blob and a first bounding region of a first blob tracker associated with the identified blob;
determining a second intersection region between the identified blob and a second bounding region of a second blob tracker associated with the identified blob;
determining an area of the identified blob;
determining an intersection area of the first intersection region and the second intersection region; and
wherein the identified blob is split into the first blob and the second blob when the intersection area is greater than a threshold amount of the area of the identified blob.

26. The apparatus of claim 20, wherein, when the identified blob is associated with more than two blob trackers, the processor is further configured to:
select a first bounding region of a first blob tracker associated with the identified blob as a primary bounding region, the primary bounding region being selected such that a union of remaining bounding regions associated with the identified blob have a smallest size; and
combine a second bounding region of a second blob tracker and a third bounding region of a third blob tracker into a combined bounding region, wherein the second blob tracker and the third blob tracker are associated with the identified blob.

27. The apparatus of claim 26, wherein determining the one or more splitting conditions are met includes:
determining the first bounding region of the first blob tracker and the combined bounding region encompass at least a threshold amount of foreground pixels of the identified blob;
determining at least a threshold amount of foreground pixels encompassed by the first bounding region of the first blob tracker and the combined bounding region include foreground pixels of the identified blob; and
wherein the identified blob is split into the first blob and the second blob when the first bounding region of the first blob tracker and the combined bounding region encompass at least the threshold amount of the foreground pixels of the identified blob and when at least the threshold amount of foreground pixels encompassed by the first bounding region of the first blob tracker and the combined bounding region include foreground pixels of the identified blob.

28. A non-transitory computer-readable medium having stored thereon instructions that, when executed by one or more processors, cause the one or more processor to:
identify a blob detected for a current video frame, wherein the identified blob includes pixels of at least a portion of a foreground object in the current video frame;
determine the identified blob is associated with two or more blob trackers from a plurality of blob trackers, wherein the plurality of blob trackers are received from an object tracking operation performed for a previous video frame;
determine one or more splitting conditions are met, wherein the one or more splitting conditions are based on an amount of overlap between bounding regions of the two or more blob trackers and a bounding region of the identified blob;
in response to determining the one or more splitting conditions are met, split the identified blob into a first blob and a second blob;
output the first blob and the second blob for object tracking for the current video frame; and
perform object tracking for the current video frame using the first blob and the second blob.

29. The apparatus of claim 20, wherein the identified blob is not output for object tracking for the current video frame.

30. The apparatus of claim 20, wherein the processor is further configured to:
obtain a list of blobs detected for the current video frame, the list of blobs including the identified blob;
modify the list of blobs by including the first blob and the second blob and by removing the identified blob; and
output the modified list of blobs for the object tracking for the current video frame.

* * * * *